United States Patent
Yamamoto et al.

(10) Patent No.: US 12,041,670 B2
(45) Date of Patent: Jul. 16, 2024

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Rikin Shah, Langen (DE); Akihiko Nishio, Osaka (JP); Ming-Hung Tao, Frankfurt am Main (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 274 days.

(21) Appl. No.: 17/429,262

(22) PCT Filed: Dec. 4, 2019

(86) PCT No.: PCT/JP2019/047377
§ 371 (c)(1),
(2) Date: Aug. 6, 2021

(87) PCT Pub. No.: WO2020/166179
PCT Pub. Date: Aug. 20, 2020

(65) Prior Publication Data
US 2022/0104279 A1    Mar. 31, 2022

(30) Foreign Application Priority Data
Feb. 14, 2019   (JP) .................................. 2019-024182

(51) Int. Cl.
*H04W 74/0833*   (2024.01)
*H04W 74/00*     (2009.01)
(Continued)

(52) U.S. Cl.
CPC ..... *H04W 74/0841* (2013.01); *H04W 74/006* (2013.01); *H04W 74/0866* (2013.01); *H04W 80/02* (2013.01)

(58) Field of Classification Search
CPC ........... H04W 74/0841; H04W 74/006; H04W 74/0866; H04W 80/02; H04W 74/0833; H04W 92/10
See application file for complete search history.

(56) References Cited

U.S. PATENT DOCUMENTS 6,381,229 B1    4/2002   Narvinger et al.
10,873,975 B2*  12/2020  Freda .................... H04W 72/23
(Continued)

FOREIGN PATENT DOCUMENTS

JP    2002516515 A    6/2002
WO    2018/064367 A1  4/2018
(Continued)

OTHER PUBLICATIONS

Extended European Search Report, dated Mar. 11, 2022, for European Application No. 19915434.5-1215, 11 pages.
(Continued)

*Primary Examiner* — Abdullahi Ahmed
(74) *Attorney, Agent, or Firm* — Seed IP Law Group LLP

(57) ABSTRACT

A terminal, with which it is possible to improve the efficiency of a random access process. In a terminal (200), a control unit (209) dynamically determines a parameter pertaining to the transmission of a data part out of a random access signal that includes a preamble part and the data part. A transmission unit (217) notifies the determined parameter to a base station (100) using the random access signal.

20 Claims, 15 Drawing Sheets

(51) Int. Cl.
*H04W 74/08* (2009.01)
*H04W 80/02* (2009.01)

(56) References Cited

U.S. PATENT DOCUMENTS

| | | | |
|---|---|---|---|
| 11,229,062 | B2 | 1/2022 | Huang |
| 11,632,803 | B2 | 4/2023 | Cirik et al. |
| 2019/0350000 | A1 | 11/2019 | Zhang et al. |
| 2019/0357268 | A1 | 11/2019 | Zhao et al. |
| 2019/0364599 | A1* | 11/2019 | Islam ............... H04L 5/0048 |
| 2021/0105833 | A1* | 4/2021 | Freda ............... H04L 5/0055 |
| 2021/0144770 | A1* | 5/2021 | Tang ............. H04W 72/0453 |
| 2021/0144776 | A1* | 5/2021 | Xu ............... H04W 74/0833 |
| 2022/0190906 | A1 | 6/2022 | Haghighat et al. |
| 2022/0217810 | A1* | 7/2022 | Bao ................. H04W 76/27 |
| 2022/0394774 | A1* | 12/2022 | Li ...................... H04B 7/06 |

FOREIGN PATENT DOCUMENTS

| | | |
|---|---|---|
| WO | 2018/127223 A1 | 7/2018 |
| WO | 2018/130017 A1 | 7/2018 |
| WO | 2020168103 A1 | 8/2020 |

OTHER PUBLICATIONS

3GPP TS 38.211 V15.4.0, "3rd Generation Partnership Project; Technical Specification Group Radio Access Network; NR; Physical channels and modulation (Release 15)," Dec. 2018, 96 pages.
3GPP TS 38.212 V15.4.0, "3rd Generation Partnership Project; Technical Specification Group Radio Access Network; NR; Multiplexing and channel coding (Release 15)," Dec. 2018, 100 pages.
3GPP TS 38.213 V15.4.0, "3rd Generation Partnership Project; Technical Specification Group Radio Access Network; NR; Physical layer procedures for control (Release 15)," Dec. 2018, 104 pages.
3GPP TS 38.214 V15.4.0, "3rd Generation Partnership Project; Technical Specification Group Radio Access Network; NR; Physical layer procedures for data (Release 15)," Dec. 2018, 102 pages.
3GPP TS 38.300 V15.4.0, "3rd Generation Partnership Project; Technical Specification Group Radio Access Network; NR; NR and NG-RAN Overall Description; Stage 2 (Release 15)," Dec. 2018, 97 pages.
3GPP TS 38.321 V15.4.0, "3rd Generation Partnership Project; Technical Specification Group Radio Access Network; NR; Medium Access Control (MAC) protocol specification (Release 15)," Dec. 2018, 77 pages.
3GPP TS 38.331 V15.4.0, "3rd Generation Partnership Project; Technical Specification Group Radio Access Network; NR; Radio Resource Control (RRC) protocol specification (Release 15)," Dec. 2018, 474 pages.
Bertenyi et al., "5G NR Radio Interface," *Journal of ICT*, 6(1 and 2), dated May 3, 2018, pp. 31-58 (28 total pages).
InterDigital Communications, "2-step random access procedure," R1-1700703, Agenda Item: 5.1.1.4.3, 3GPP TSG RAN WG1 AH_NR Meeting, Spokane, USA, Jan. 16-20, 2017, 4 pages.
International Search Report, dated Feb. 18, 2020, for corresponding International Application No. PCT/JP2019/047377, 2 pages.
Nokia, Nokia Shanghai Bell, "On 2-step Random Access Procedure," R1-1901192, Agenda Item: 7.2.14, 3GPP TSG RAN WG1 Ad_Hoc Meeting 1901, Taipei, Taiwan, Jan. 21-25, 2019, 7 pages.
Sony, "Discussions on 2 Steps RACH Procedure," R1-1700668, Agenda Item: 5.1.1.4.3, 3GPP TSG RAN WG1 Meeting AH_NR Meeting, Spokane, USA, Jan. 16-20, 2017, 5 pages.
ZTE Corporation, Sanechips, "New work item: 2-step RACH for NR," RP-182881, Agenda Item: 9.1.1, 3GPP TSG RAN Meeting #82, Sorrento, Italy, Dec. 10-13, 2018, 5 pages.
Asustek, "Consideration of fallback of 2-step RACH procedure" R2-1700024, Agenda Item: 3.2.1.4, 3GPP TSG-RAN WG2 Meeting #NR Ad Hoc, Spokane, USA, Jan. 17-19, 2017. (4 pages).
Huawei, HiSilicon, "Two-step RACH procedure for NR-U" R2-1816617, Agenda Item: 11.2.1.1, 3GPP TSG-RAN WG2 Meeting #104, Spokane, USA, Nov. 12-16, 2018. (4 pages).
Jin, "LS on NR RACH Procedure" R1-1610992, 3GPP TSG-RAN1 WG2 Meeting #86bis, Lisbon, Portugal, Oct. 10-14, 2016. (4 pages).
NTT DOCOMO, INC., "Design for RACH Procedure for NR," R1-167378, Agenda Item: 8.1.6, 3GP TSG RAN WG1 Meeting #86 Göteborg, Sweden, Aug. 22-26, 2016. (4 pages).
ZTE Corporation, ZTE Microelectronics, "On 2-step Random access procedure," R1-1608969, Agenda item: 8.1.5.2, 3GPP TSG RAN WG1 Meeting #86b, Lisbon, Portugal, Oct. 10-14, 2016. (3 pages).

* cited by examiner

200

| TBS | RACH preamble resource (set) |
|---|---|
| $X_1$ | $Z_1$ |
| $X_2$ | $Z_2$ |
| $X_3$ | $Z_3$ |
| ... | ... |

FIG. 7

| MAC subPDU1 (BI only) | MAC subPDU2 (RAPID only) | MAC subPDU3A (RAPID and RAR) | MAC subPDU3B (Contention resolution MAC CE) | MAC subPDU4A (RAPID and RAR) | MAC subPDU4B (Contention resolution MAC CE) | ... |

FIG. 8

| MAC subPDU1 (BI only) | MAC subPDU2 (RAPID only) | MAC subPDU3A (RAPID and RAR) | MAC subPDU3B (Contention resolution MAC CE) | MAC subPDU3C (RRC message) | MAC subPDU4A (RAPID and RAR) | MAC subPDU4B (Contention resolution MAC CE) | MAC subPDU4C (RRC message) | ... |

FIG. 9

| Buffer value | TBS | RACH preamble resource (set) | T/F resource position/size |
|---|---|---|---|
| $\leqq Y_1$ | $X_1$ | $Z_1$ | Resource 1 |
| $\leqq Y_2$ | $X_2$ | $Z_2$ | Resource 2 |
| $\leqq Y_3$ | $X_3$ | $Z_3$ | Resource 3 |
| ... | ... | ... | ... |

FIG. 12

| Path loss | Buffer value | TBS | RACH preamble resource (set) | MCS |
|---|---|---|---|---|
| > Th | ≤ $Y_1$ | $X_1$ | $Z_1$ | MCS $A_1$ (low MCS) |
| | ≤ $Y_2$ | $X_2$ | $Z_2$ | |
| | ... | ... | ... | |
| ≤ Th | <= $Y_1$ | $X_1$ | $Z_1$ | MCS $A_2$ (high MCS) |
| | ≤ $Y_2$ | $X_2$ | $Z_2$ | |
| | ... | ... | ... | |
| ... | ... | ... | ... | ... |

FIG. 13

| Buffer value | Allowable TBS | Maximum TBS | RACH preamble resource (set) |
|---|---|---|---|
| ≤ $Y_1$ | $X_1, X_2, X_3$ ($X_1 < X_2 < X_3$) | $X_3$ | $Z_1$ |
| ≤ $Y_2$ | $X_4, X_5, X_6$ ($X_4 < X_5 < X_6$) | $X_6$ | $Z_2$ |
| ≤ $Y_3$ | $X_7, X_8, X_9$ ($X_7 < X_8 < X_9$) | $X_9$ | $Z_3$ |
| ... | ... | ... | ... |

FIG. 14

| Buffer value | TBS | RACH preamble resource (set) | Number of preamble candidates |
|---|---|---|---|
| ≤ $Y_1$ | $X_1$ | $Z_1$ | N1 |
| ≤ $Y_2$ | $X_2$ | $Z_2$ | N2 (N1 ≤ N2) |
| ≤ $Y_3$ | $X_3$ | $Z_3$ | N3 (N2 ≤ N3) |
| ... | ... | ... | ... |
| Note: $X_1 < X_2 < X_3$ | | | |

FIG. 15

| TBS | Index in UCI |
|---|---|
| $X_1$ | 1 |
| $X_2$ | 2 |
| $X_3$ | 3 |
| ... | ... |

FIG. 17

| Buffer value | TBS | Index in UCI |
|---|---|---|
| $\leq Y_1$ | $X_1$ | 1 |
| $\leq Y_2$ | $X_2$ | 2 |
| $\leq Y_3$ | $X_3$ | 3 |
| ... | ... | ... |

FIG. 18

TERMINAL AND COMMUNICATION METHOD

TECHNICAL FIELD

The present disclosure relates to a terminal and a communication method.

BACKGROUND ART

In 3rd Generation Partnership Project (3GPP), the specification for Release 15 New Radio access technology (NR) has been completed for realization of the 5th Generation mobile communication systems (5G). NR supports functions for realizing Ultra Reliable and Low Latency Communication (URLLC) in conjunction with high speed and large capacity that are basic requirements for enhanced Mobile Broadband (eMBB) (see, e.g., Non-Patent Literatures (hereinafter referred to as "NPLs") 1 to 7).

CITATION LIST

Non-Patent Literature

NPL 1
3GPP TS 38.211 V15.4.0, "NR; Physical channels and modulation (Release 15)," December 2018
NPL 2
3GPP TS 38.212 V15.4.0, "NR; Multiplexing and channel coding (Release 15)," December 2018
NPL 3
3GPP TS 38.213 V15.4.0, "NR; Physical layer procedure for control (Release 15)," December 2018
NPL 4
3GPP TS 38.214 V15.4.0, "NR; Physical layer procedures for data (Release 15)," December 2018
NPL 5
3GPP, TS38.300 V15.4.0, "NR; NR and NG-RAN overall description; Stage 2 (Release 15)," December 2018
NPL 6
3GPP, TS38.321 V15.4.0, "NR; Medium access control (MAC) protocol specification (Release 15)," December 2018
NPL 7
3GPP. TS38.331 V15.4.0, "NR; Radio resource control (RRC) protocol specification (Release 15)," December 2018
NPL 8
B. Bertenyi, S. Nagata, H. Kooropaty, X. Zhou, W. Chen, Y. Kim, X. Dai, and X. Xu, "5G NR radio interface," Journal of ICT, Vol. 6 and 2, pp. 31-58, 2018
NPL 9
RP-182881, "New work item: 2-step RACH for NR," ZTE Corporation, Sanechips, December 2018

SUMMARY OF INVENTION

However, random access processing in NR has not comprehensively been studied.

One non-limiting and exemplary embodiment of the present disclosure facilitates providing a terminal and a communication method capable of improving the efficiency of random access processing.

A terminal according to an exemplary embodiment of the present disclosure includes: control circuitry, which, in operation, dynamically determines a parameter relevant to transmission of a data part of a random access signal including a preamble part and the data part; and transmission circuitry, which, in operation, notifies a base station of the determined parameter using the random access signal.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to improve the efficiency of random access processing.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7 illustrates an exemplary association between TBSs and RACH preamble resource sets according to Embodiment 1;

FIG. 8 illustrates exemplary Message B;

FIG. 9 illustrates another exemplary Message B;

FIG. 12 illustrates an exemplary association between transmission parameters and the RACH preamble resource sets according to Embodiment 2:

FIG. 13 illustrates an exemplary association between the transmission parameters and the RACH preamble resource sets according to Embodiment 2;

FIG. 14 illustrates an exemplary association of the transmission parameters and the RACH preamble resource sets according to Embodiment 2;

FIG. 15 illustrates an exemplary association of the transmission parameters and the RACH preamble resource sets according to Embodiment 2;

FIG. 17 illustrates an exemplary association between the TBSs and UCI according to Embodiment 3; and FIG. 18 illustrates an exemplary association between the TBSs and UCI according to Embodiment 4.

DESCRIPTION OF EMBODIMENTS

Hereinafter, embodiments of the present disclosure will be described in detail with reference to the accompanying drawings.

In Release 15 NR, a terminal (also referred to as "mobile station" or "User Equipment (UE)") transmits a random access channel signal (Random Access Channel (RACH)) to a base station (also referred to as "gNB" or "eNB"), for example, in the following cases:
(1) At the time of initial access (e.g., transition from an RRC_IDLE state to an RRC_CONNECTED state)
(2) When resuming from an RRC_INACTIVE state to the RRC_CONNECTED state
(3) When downlink data or uplink data occurs during connection (e.g., when an uplink synchronization state is "non-synchronized" in the RRC_CONNECTED state)
(4) When requesting on-demand System Information (SI)
(5) When recovering from beam-connection failure (Beam failure recovery (BFR)).

By the transmission of the random access channel signal, connection or reestablishment of synchronization by the terminal with the base station is attempted. A series of operations performed for such connection or reestablishment of synchronization by the terminal with the base station are called a "Random access procedure."

Figure 1:
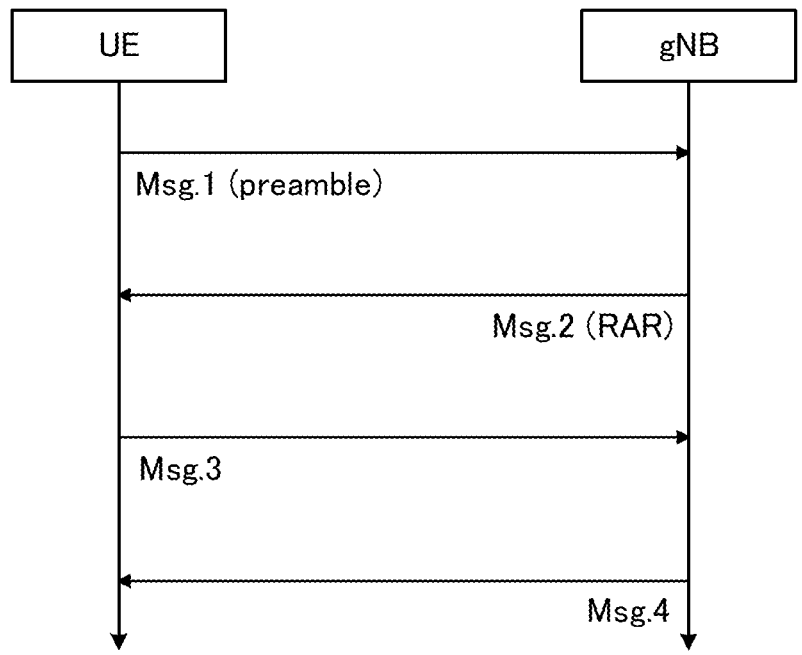
FIG. 1 illustrates an exemplary 4-step Random access procedure.

In Release 15 NR, the Random access procedure is composed of, for example, four steps illustrated in FIG. 1 (referred to as "4-step Random access procedure" or "4-step RACH procedure") (see, e.g., NPL 8).

<Step 1: Transmission of Message 1>

The terminal (e.g., UE) randomly selects a RACH preamble resource to be actually used from among sets of RACH preamble resource candidates (e.g., resources specified by a combination of time resources, frequency resources, and sequence resources). Then, the terminal transmits a RACH preamble (also referred to simply as "preamble") to the base station (e.g., gNB) using the selected RACH preamble resource. The RACH preamble may be referred to as "Message 1," for example.

<Step 2: Transmission of Message 2>

When detecting the RACH preamble, the base station transmits a RACH response (Random Access Response (RAR)). The RAR may be referred to as "Message 2," for example. Note that, at this point, the base station cannot identify the terminal having transmitted the RACH preamble. Thus, the RAR is transmitted, for example, entirely in a cell covered by the base station.

The RAR includes, for example, information on a resource (uplink resource) used by the terminal for transmission of an uplink signal (Step 3: transmission of Message 3), or information on a transmission timing of uplink transmission by the terminal. Here, when the terminal having transmitted the RACH preamble does not receive the RAR within a specified period (e.g., called a RAR reception window) starting from the transmission timing of the RACH preamble, the terminal again selects the RACH preamble resource and transmits the RAR preamble (in other words, retransmission of Message 1).

<Step 3: Transmission of Message 3>

The terminal transmits "Message 3" including, for example, an Radio Resource Control (RRC) connection request, a scheduling request, or the like using an uplink resource indicated by the base station by the RAR.

<Step 4: Transmission of Message 4>

The base station transmits, to the terminal, a message (called "Message 4") including identification information (e.g., UE-ID) for identifying the terminal. The base station transmits Message 4 to confirm that there is no contention between multiple terminals (contention resolution). Note that, for example, Cell-Radio Network Temporary Identifier (C-RNTI), Temporary C-RNTI, or the like may be used as the UE-ID.

One example of the 4-step Random access procedure has been described above.

Figure 2:
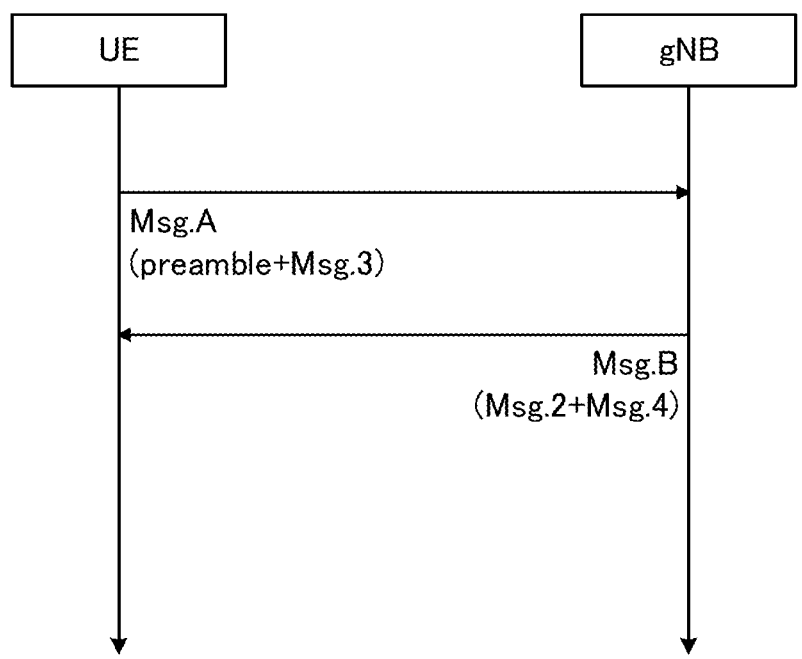
FIG. 2 illustrates an exemplary 2-step Random access procedure.

As for Release 16 NR, in order to efficiently perform connection or reestablishment of synchronization by the terminal with the base station with low latency, a Random access procedure composed of two steps, for example, illustrated in FIG. 2 (which may also be referred to as "2-step Random access procedure" or "2-step RACH procedure") has been studied (e.g., see NPL 9).

<Step 1: Transmission of Message A>

The terminal transmits, to the base station, a message (hereinafter, referred to as "Message A") including information corresponding to Message 1 (in other words, preamble) and Message 3 corresponding to Step 1 and Step 3 of the 4-step Random access procedure (see, e.g., FIG. 1).

<Step 2: Transmission of Message B>

When detecting Message A, the base station transmits Message B. Message B includes, for example, information corresponding to Message 2 or Message 4 of the 4-step Random access procedure (see, e.g., FIG. 1)(e.g., the information of one or both of Messages 2 and 4).

The 2-step Random access procedure is desired to be designed so as to be commonly applicable to main use cases such as eMBB, URLCC, and support for multiple Machine Type Communication (MTC) (mMTC: massive MTC) terminals, or, to license bands and unlicensed bands expected in 5G, for example.

Here, in the Random access procedure, low-latency uplink data transmission is achieved by transmitting, in the uplink transmission of Message 3, user (User Plane (UP)) data that the terminal actually desires to transmit to the base station, in addition to a signal (e.g., also referred to as Control-plane (C-plane) data) for controlling communication such as an RRC connection request or a scheduling request.

For example, in Release 16, it is expected to support transmission of the UP data (or Physical Uplink Shared Channel (PUSCH)) in the 2-step Random access procedure in the RRC_CONNECTED state (see, e.g., NPL 9). Note that, support for transmission of UP data in the 2-step Random access procedure in the RRC_IDLE or RRC_INACTIVE state is not within the scope of study of Release 16. However, the state of the terminal when the terminal starts the 2-step Random access procedure is not limited to the RRC_CONNECTED state.

A case where the transmission of the UP data is supported in the 2-step Random access procedure will be described below.

In the 4-step Random access procedure, as described above, the terminal transmits Message 3 using the uplink resource indicated by the base station using the RAR. At this time, the terminal is capable of including the UP data in Message 3 in addition to the C-plane data such as the RRC connection request, scheduling request, or the like.

Here, the RAR includes information on resources used by the terminal in uplink (e.g., positions of time resources or frequency resources, resource amount (or resource size), Modulation and Coding Scheme (MCS), and the like). The terminal determines the Transport Block Size (TBS) of uplink transmission by using the above-mentioned information on resources (see, e.g., NPLs 3 and 4). As is understood, in the 4-step Random access procedure, the base station is capable of controlling the uplink UP data transmission of the terminal using the RAR. Accordingly, the base station is capable of correctly demodulating and decoding Message 3 transmitted by the terminal.

On the other hand, in the 2-step Random access procedure, in Message A, the terminal transmits a signal (e.g., referred to as a RACH data part or simply as a data part) corresponding to Message 1 (e.g., the RACH preamble) and Message 3 of the 4-step Random access procedure. Accordingly, when transmitting the UP data in Message A, the terminal transmits the UP data in the data part of Message A without information on resources used in the uplink included in an indication (e.g., RAR) from the base station (in other words, UL grant).

Here, by way of example, a method is conceivable in which transmission of a fixed TBS is supported by pre-configuring the terminal semi-statically with the information on resources used for the data part of Message A to be transmitted by the terminal (e.g., positions of time resources and frequency resources, resource amount, MCS, and the like), using broadcast information or a higher layer signalling (e.g., an RRC signal) from the base station.

However, as described above, the 2-step Random access procedure is desired to be designed to be commonly applicable to all use cases of 5G, and it is assumed that the uplink UP data amount transmitted by the terminal is not a fixed amount but different depending on the use cases.

Further, traffic may be different depending on assumed services even in one use case. In URLLC as an illustrative example, transmission of a packet of 32 Byte is expected in Release 15, whereas the URLLC service is expected to be extended in Release 16, and transmission of a packet of a larger packet size (e.g., 256 Byte or the like) is expected.

When the amount of uplink UP data transmitted by the terminal is variable, the method of supporting the transmission of a fixed TBS is not flexible for uplink resource allocation.

The 2-step Random access procedure is particularly useful for application to low-latency use cases. In application, when uplink resources are not allocated enough for the amount of UP data transmitted by the terminal, segmentation of the UP data undesirably takes place. In this case, the UP data that cannot be transmitted by the 2-step Random access procedure is reserved until the next uplink data transmission occasion. Consequently, a large latency may occur for completion of transmission of the UP data, making it impossible to satisfy the low-latency requirements of URLLC.

In addition, as another example, a method of fixedly configuring uplink resources (e.g., TBS) in accordance with the maximum amount of UP data expected to be transmitted by the terminal is conceivable. However, this method requires a large amount of radio resources to be secured for the 2-step Random access procedure, thus degrading resource utilization efficiency.

In consideration of the above, a description will be given of an exemplary embodiment of the present disclosure in relation to a method for improving uplink transmission efficiency in the 2-step Random access procedure.

Hereinafter, embodiments of the present invention will be described in detail.

Embodiment 1

[Overview of Communication System]

A communication system according to each embodiment of the present disclosure includes base station 100 and terminal 200.

Figure 3:
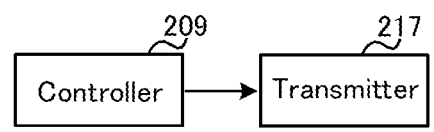
FIG. 3 is a block diagram illustrating a configuration example of a part of a terminal according to Embodiment 1.

FIG. 3 is a block diagram illustrating a configuration example of a part of terminal 200 according to each embodiment of the present disclosure. In terminal 200 illustrated in FIG. 3, controller 209 (corresponding to the control circuitry) dynamically determines a parameter (e.g., TBS or the like) relevant to transmission of a data part (e.g., corresponding to the data part of Message A) of a random access signal (e.g., corresponding to Message A) including a preamble part (e.g., corresponding to the RACH preamble of Message A) and the data part. Transmitter 217 (corresponding to the transmission circuitry) notifies base station 100 of the determined parameter using the random access signal.

[Configuration of Base Station]

Figure 4:
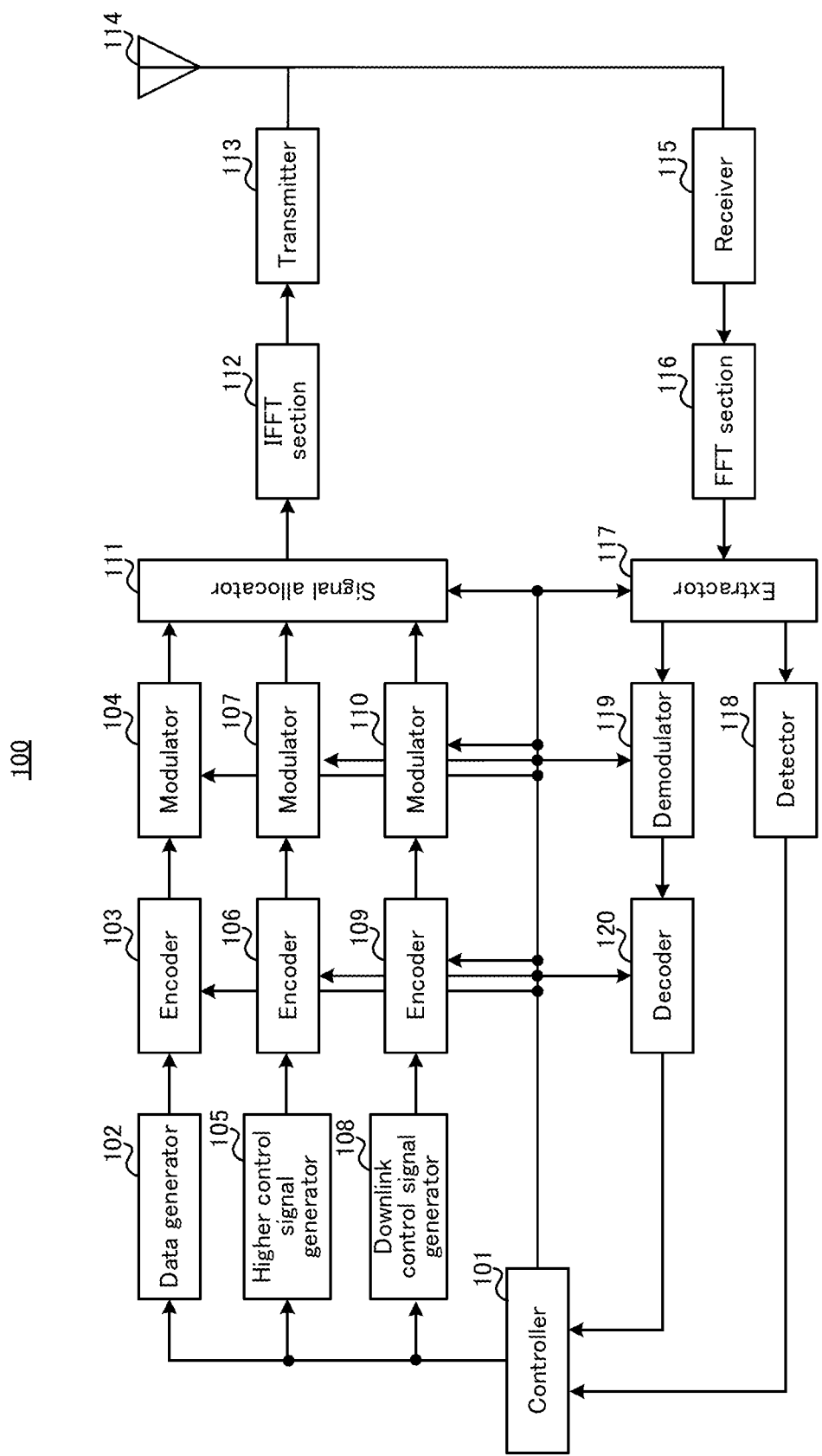
FIG. 4 is a block diagram illustrating a configuration example of a base station according to Embodiment 1.

FIG. 4 is a block diagram illustrating a configuration example of base station 100 according to Embodiment 1 of the present disclosure. In FIG. 4, base station 100 includes controller 101, data generator 102, encoder 103, modulator 104, higher control signal generator 105, encoder 106, modulator 107, downlink control signal generator 108, encoder 109, modulator 110, signal allocator 111, Inverse Fast Fourier Transform (IFFT) section 112, transmitter 113, antenna 114, receiver 115, Fast Fourier Transform (FFT) section 116, extractor 117, detector 118, demodulator 119, and decoder 120.

Controller 101 determines information for transmission of Message A by terminal 200, and outputs the determined information to extractor 117, demodulator 119, and decoder 120. Further, controller 101 outputs the determined information to higher control signal generator 105.

The information for transmission of Message A may include, for example, information on the TBS of a data part of Message A, information on the association between TBSs and Message-A RACH preamble resource candidate sets, or information on the association between Message-A data part resource candidate sets (e.g., at least one of a resource position and a resource amount) and the Message-A RACH preamble resource candidate sets.

In addition, controller 101 determines radio resource allocation (e.g., downlink resources, MCS, and the like) for a downlink signal for transmitting a data signal (e.g., Message B or the like), a higher layer control signal (e.g., higher control signal), or downlink control information (e.g., downlink control signal). Controller 101 outputs the determined information to encoders 103, 106, and 109, modulators 104, 107, and 110, and signal allocator 111. Further, controller 101 outputs the determined information to downlink control signal generator 108.

In addition, based on a decoding result of Message A (e.g., C-Plane data or UP data) inputted from decoder 120 and a detection result of Message A (e.g., RACH preamble) inputted from detector 118, controller 101 determines information to be included in Message B, and outputs the determined information to data generator 102.

Data generator 102 generates an information bit sequence (in other words, downlink data) of Message B using the information to be included in Message B inputted from controller 101, and outputs the generated information bit sequence to encoder 103.

Encoder 103 performs error coding on the information bit sequence (data signal) inputted from data generator 102, and outputs the encoded data signal to modulator 104.

Modulator 104 modulates the data signal inputted from encoder 103, and outputs the modulated data signal to signal allocator 111.

Higher control signal generator 105 generates a control information bit sequence (higher control signal) using the control information inputted from controller 101, and outputs the generated control information bit sequence (higher control signal) to encoder 106.

Encoder 106 performs error correction coding on the control information bit sequence inputted from higher control signal generator 105, and outputs the encoded control signal to modulator 107.

Modulator 107 modulates the control signal inputted from encoder 106, and outputs the modulated control signal to signal allocator 111.

Downlink control signal generator 108 generates a control information bit sequence (downlink control signal: for example, DCI) using the control information inputted from controller 101, and outputs the generated control information bit sequence to encoder 109. Note that, the control information may be transmitted to a plurality of terminals. Accordingly, downlink control signal generator 108 may scramble the control information (e.g., Physical Downlink Control Channel (PDCCH)) for the terminals using identification information (e.g., Random Access-RNTI (RA-RNTI)) for all terminals, UE-specific identification information (e.g., C-RNTI), or the like.

Encoder 109 performs error correction coding on the control information bit sequence inputted from downlink control signal generator 108, and outputs the encoded control signal to modulator 110.

Modulator 110 modulates the control signal inputted from encoder 109, and outputs the modulated control signal to signal allocator 111.

Based on the information indicating the radio resources inputted from controller 101, signal allocator 111 maps, to the radio resources, the data signal inputted from modulator 104, the higher control signal inputted from modulator 107, or the downlink control signal inputted from modulator 110. Signal allocator 111 outputs, to IFFT section 112, the downlink signal to which the signal is mapped.

IFFT section 112 performs transmission waveform generation processing such as OFDM on the signal inputted from signal allocator 111. In the case of OFDM transmission with Cyclic Prefix (CP) addition, IFFT section 112 adds CP (not illustrated). IFFT section 112 outputs the generated transmission waveform to transmitter 113.

Transmitter 113 performs Radio Frequency (RF) processing such as Digital-to-Analog (D/A) conversion, up-conversion, and the like on the signal inputted from IFFT section 112, and transmits a radio signal to terminal 200 via antenna 114.

Receiver 115 performs RF processing such as down-conversion or Analog-to-Digital (A/D) conversion on an uplink signal waveform received via antenna 114 from terminal 200, and outputs the uplink signal waveform after the reception processing to FFT section 116.

FFT section 116 performs, on the uplink signal waveform inputted from receiver 115, FFT processing for converting a time-domain signal into a frequency-domain signal. FFT section 116 outputs the frequency-domain signal obtained by the FFT processing to extractor 117.

Based on the information inputted from controller 101, extractor 117 extracts, from the signal inputted from FFT section 116, a radio resource portion by which the RACH preamble is transmitted, a radio resource portion by which UCI is transmitted, or a radio resource portion by which data of Message A is transmitted. Extractor 117 outputs, to detector 118, the extracted radio resource portion by which the RACH preamble is transmitted, and outputs, to demodulator 119, the extracted radio resource portion by which the UCI is transmitted, or the extracted radio resource portion by which the data of Message A is transmitted.

Detector 118 performs RACH preamble detection on the radio resource portion inputted from extractor 117 that corresponds to the RACH preamble. Detector 118 outputs information on the detection result of detection of the RACH preamble to controller 101.

Based on the information inputted from controller 101, demodulator 119 demodulates the radio resource portion corresponding to the UCI or the radio resource portion corresponding to the data of Message A that are inputted from extractor 117, and outputs a demodulation result (demodulation sequence) to decoder 120.

Based on the information inputted from controller 101, decoder 120 performs error correction decoding on the demodulation result inputted from demodulator 119, and outputs the decoded bit sequence (including, for example, UCI, C-Plane data, or UP data). For example, decoder 120 outputs the obtained UCI to controller 101.

[Configuration of Terminal]

Figure 5:
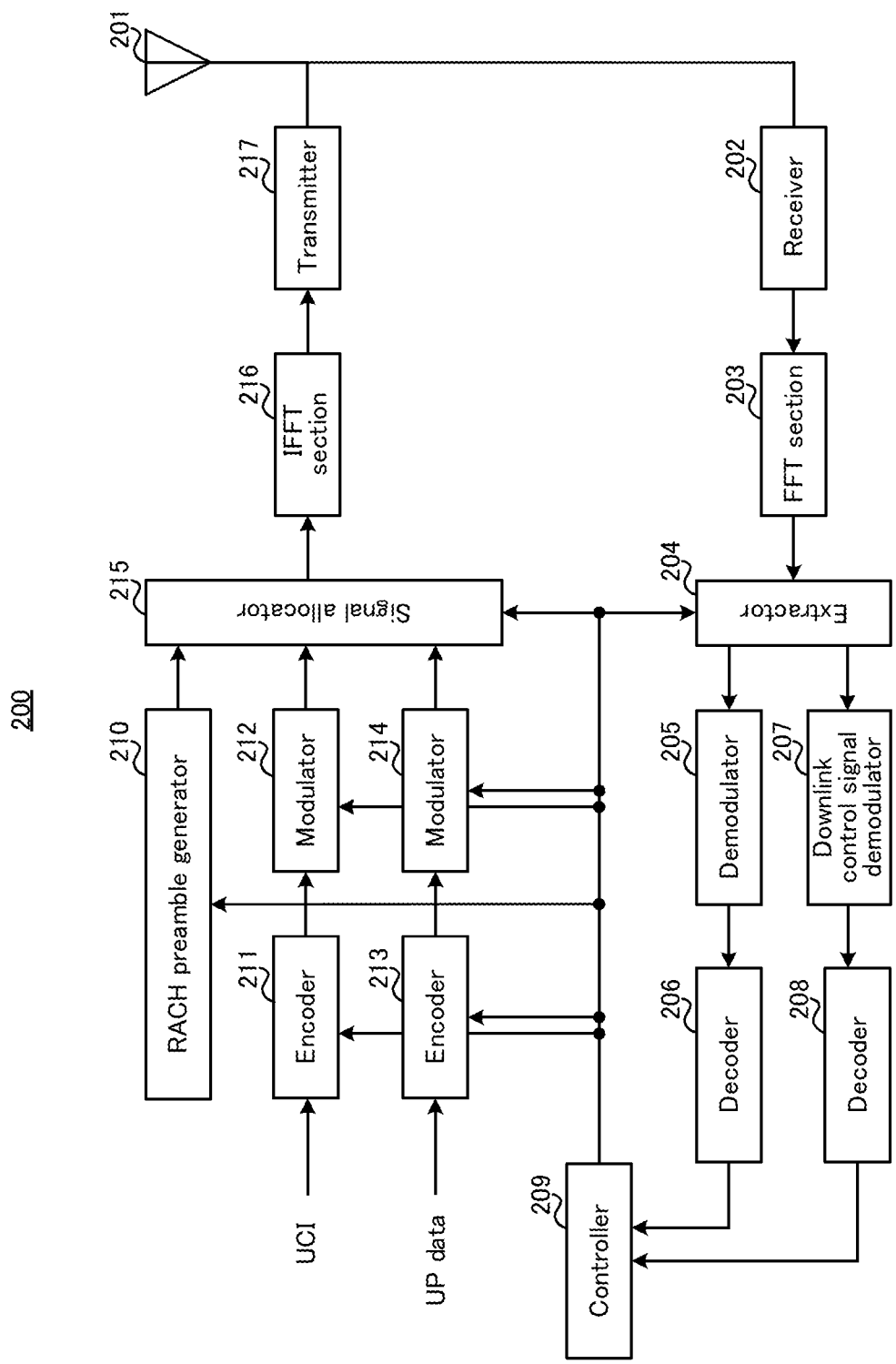
FIG. 5 is a block diagram illustrating a configuration example of the terminal according to Embodiment 1.

FIG. 5 is a block diagram illustrating a configuration example of terminal 200 according to the embodiment of the present disclosure. In FIG. 5, terminal 200 includes antenna 201, receiver 202, FFT section 203, extractor 204, demodulator 205, decoder 206, downlink control signal demodulator 207, decoder 208, controller 209, RACH preamble generator 210, encoder 211, modulator 212, encoder 213, modulator 214, signal allocator 215, IFFT section 216, and transmitter 217.

Receiver 202 performs RF processing such as down-conversion, Analog-to-Digital (A/D) conversion, or the like on the signal waveform of the downlink signal from base station 100 received via antenna 201, and outputs the reception signal obtained (baseband signal) to FFT section 203. The downlink signal includes, for example, a data signal (e.g., Message B or the like), a higher control signal, or a downlink control signal.

FFT section 203 performs, on the signal (time-domain signal) inputted from receiver 202, FFT processing for converting the time-domain signal into a frequency-domain signal. FFT section 203 outputs the frequency domain signal obtained by the FFT processing to extractor 204.

Based on the control information inputted from controller 209 (e.g., information relevant to radio resources for the control signal), extractor 204 extracts the data signal (e.g., Message B or the like), the downlink control signal, or the higher control signal from the signal inputted from FFT section 203. Extractor 204 outputs the data signal or the higher control signal to demodulator 205, and outputs the downlink control signal to downlink control signal demodulator 207.

Demodulator 205 demodulates the data signal or the higher control signal inputted from extractor 204, and outputs the demodulation result to decoder 206.

Decoder 206 performs error correction decoding using the demodulation result inputted from demodulator 205 to obtain reception data (e.g., Message B) or control information. Decoder 206 outputs the obtained reception data or control information to controller 209.

Downlink control signal demodulator 207 demodulates the downlink control signal inputted from extractor 204, and outputs the demodulation result to decoder 208.

Decoder 208 performs error correction decoding using the demodulation result inputted from downlink control signal demodulator 207 to obtain the control information. Decoder 208 outputs the control information obtained to controller 209.

Controller 209 determines a transmission method or parameter (e.g., MCS, radio resources, or the like) for uplink transmission (e.g., transmission of Message A) based on the control information inputted from decoder 206 or decoder 208. For example, controller 209 dynamically determines (or selects) a parameter (e.g., TBS and/or the like) relevant to transmission of the data part of Message A. Controller 209 outputs the determined information to RACH preamble generator 210, encoders 211 and 213, modulators 212 and 214, and signal allocator 215.

Controller 209 also outputs, to extractor 204, the information relevant to the radio resources for the control signal that is included in the control information inputted from decoder 206 or decoder 208.

RACH preamble generator 210 generates the RACH preamble based on the control information inputted from controller 209, and outputs the generated RACH preamble to signal allocator 215.

When transmitting the UCI to base station 100, encoder 211 performs error correction coding on the UCI (e.g., UCI sequence) based on the information inputted from controller 209, and outputs the encoded UCI (bit sequence) to modulator 212.

Based on the information inputted from controller 209, modulator 212 modulates the UCI inputted from encoder 211, and outputs the modulated UCI (modulation symbol sequence) to signal allocator 215.

Based on the information inputted from controller 209, encoder 213 performs error correction coding on, for example, an information bit sequence (e.g., UP data) to be transmitted in the data part of Message A, and outputs the encoded bit sequence to modulator 214.

Based on the information inputted from controller 209, modulator 214 modulates the bit sequence inputted from encoder 213, and outputs a data signal (modulation symbol sequence) to signal allocator 215.

Signal allocator 215 maps, to the radio resources indicated by controller 209, the signal inputted from RACH preamble generator 210, the signal inputted from modulator 212, or the signal inputted from modulator 214, and outputs to IFFT section 216 the uplink signal to which the signal is mapped.

IFFT section 216 performs transmission waveform generation processing such as OFDM on the signal inputted from signal allocator 215. In the case of OFDM transmission with Cyclic Prefix (CP) addition, IFFT section 216 adds CP (not illustrated). Alternatively, when IFFT section 216 generates a single-carrier waveform, a Discrete Fourier Transform (DFT) section (not illustrated) may be added on the upstream side of signal allocator 215. IFFT section 216 outputs the generated transmission waveform to transmitter 217.

Transmitter 217 performs the RF processing such as D/A conversion, up-conversion, and/or the like on the signal inputted from IFFT section 216, and transmits a radio signal to base station 100 via antenna 201.

[Operation Example of Base Station 100 and Terminal 200]

An operation example of base station 100 and terminal 200 having the above configurations will be described.

Note hereinafter that, it is assumed that the larger the TBS of the data part of Message A, the larger the amount of resources required to transmit the data part.

Figure 6:
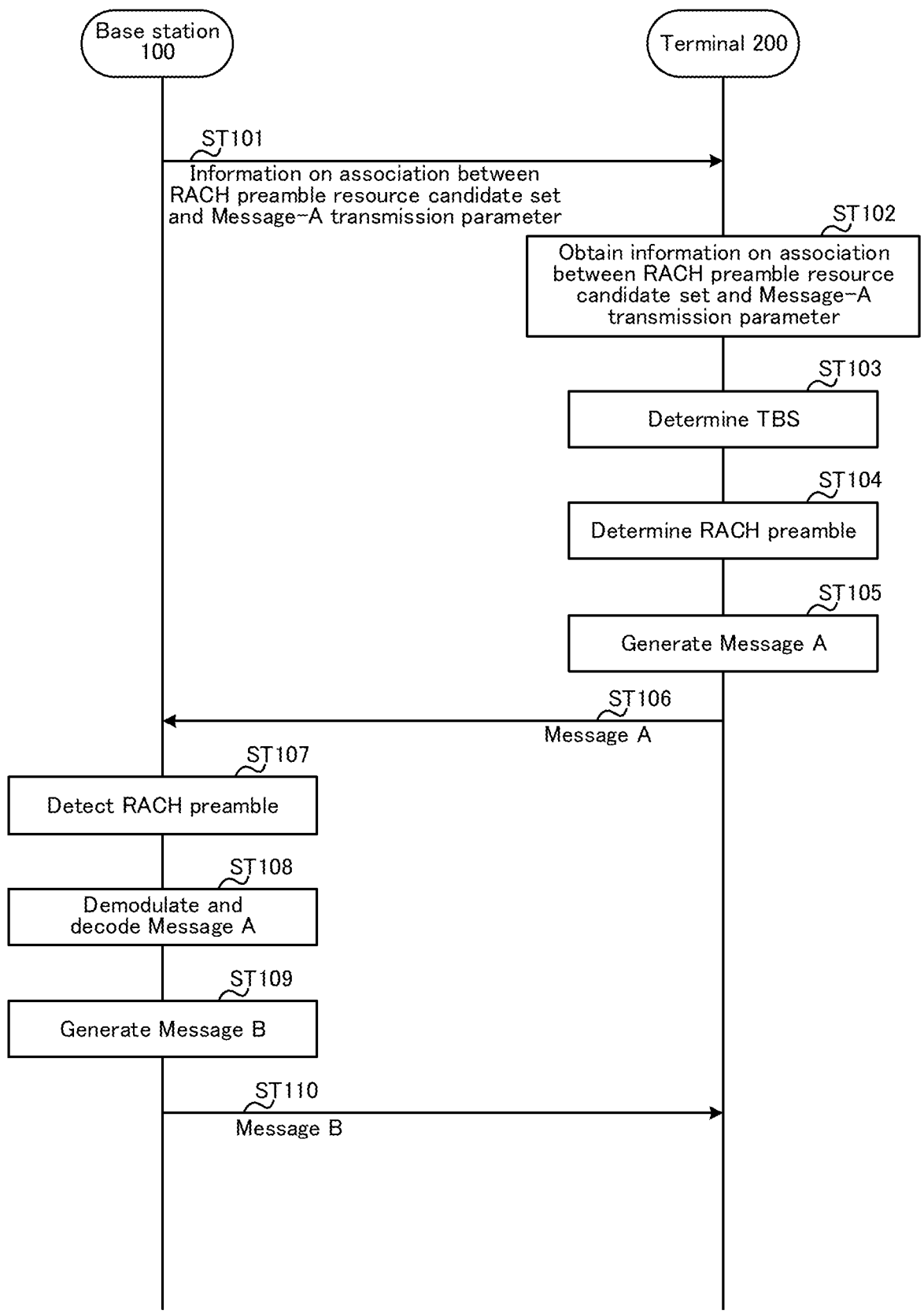
FIG. 6 is a sequence diagram illustrating an operation example of the base station and the terminal according to Embodiment 1.

FIG. 6 illustrates an example of a flow of processing of base station 100 and terminal 200 according to the present embodiment.

In the present embodiment, the information on the TBS of the data part of Message A is associated with a set of Message-A RACH preamble resource candidates (e.g., resources specified by a combination of time resources, frequency resources, and sequence resources).

For example, base station 100 generates information on the association between a RACH preamble resource set and a Message-A transmission parameter (e.g., TBS), and indicates terminal 200 of the information (ST101). Base station 100 may indicate terminal 200 of the association between the RACH preamble resource set and the Message-A transmission parameter by, for example, the higher layer signalling.

Terminal 200 obtains the information on the association between the RACH preamble resource set and the Message-A transmission parameter indicated by base station 100 (ST102). Thus, the information on the association between the RACH preamble resource set and the Message-A transmission parameter is shared between base station 100 and terminal 200.

FIG. 7 illustrates an example of the association between TBSs and RACH preamble resource candidate sets ("RACH preamble resource (set)").

In FIG. 7, TBS=$X_1$ is associated with RACH preamble resource candidate set $Z_1$, TBS=$X_2$ is associated with RACH preamble resource candidate set $Z_2$, and TBS=$X_3$ is associated with RACH preamble resource candidate set $Z_3$. Note that, the number of TBS candidates associated with the RACH preamble resource sets is not limited to three, and may be two, four, or more.

When a transmission packet (in other words, uplink signal) occurs, terminal 200 determines the TBS of the data part of Message A (ST103). For example, a plurality of TBSs may be specified in advance in the specifications as TBSs that can be selected by terminal 200, or base station 100 may configure the TBSs using a higher layer signalling (e.g., System Information Block (SIB) or an UE-specific RRC signal). For example, terminal 200 dynamically determines the TBS of the data part of Message A from among the specified or configured TBSs.

In FIG. 6, terminal 200 determines the RACH preamble to be transmitted (ST104). For example, based on the association between the TBSs and the RACH preamble resource candidate sets and from the RACH preamble resource candidate set associated with the selected TBS, terminal 200 selects a RACH preamble resource for use in implementation. For example, in FIG. 7, when TBS=$X_2$ is selected, terminal 200 selects the RACH preamble resource for use in transmission of the RACH preamble from RACH preamble resource candidate set $Z_2$ associated with TBS=$X_2$. The same applies to the case where another TBS is selected in FIG. 7.

In FIG. 6, terminal 200 generates Message A (ST105). For example, terminal 200 may generate Message A including a signal of the data part (e.g., at least one of C-Plane data and UP data) of Message A generated using the selected TBS and the RACH preamble generated using the selected RACH preamble resource.

Terminal 200 transmits generated Message A to base station 100 (ST106).

Base station 100 detects the RACH preamble included in Message A transmitted by terminal 200 (ST107). When detecting the RACH preamble, base station 100 identifies the TBS of the data part of Message A transmitted by terminal 200 from the RACH preamble resource corresponding to the detected RACH preamble based on the association between the TBSs and the RACH preamble resource sets (see, e.g., FIG. 7).

Base station 100 demodulates and decodes the data part of Message A corresponding to the detected RACH preamble using the identified TBS (ST108).

After reception processing of Message A (e.g., detection of the RACH preamble and demodulation and decoding of the data part), base station 100 generates Message B (ST109) and transmits generated Message B to terminal 200 (ST110).

Note that, the present embodiment has been described in which the TBS of the data part of Message A is used as exemplary Message-A transmission parameter, but the Message-A transmission parameter is not limited to the TBS and may be other parameters. For example, the resource information (e.g., at least one of the resource position and the resource amount) of the data part of Message A may be associated with the Message-A RACH preamble resource candidate set. In this case, when detecting the RACH preamble, base station 100 is capable of identifying, based on the detected RACH preamble resource, the resource position or the resource amount used by terminal 200 to transmit the data part of Message A. In addition, base station 100 may also calculate the TBS used for the data part using, for example, the identified resource position and resource amount of the data part, and may demodulate and decode the data part of Message A corresponding to the detected RACH preamble.

As described above, in the present embodiment, terminal 200 dynamically determines the parameter (transmission parameter) relevant to transmission of the data part of Message A (in other words, random access signal) including the RACH preamble and the data part. Thus, terminal 200 is capable of appropriately selecting the transmission parameter (e.g., TBS, resource position, or resource amount) used for the data part of Message A depending on the generated transmission packet.

In addition, in the present embodiment, terminal 200 notifies base station 100 of the determined transmission parameter using Message A. For example, in the present embodiment, terminal 200 transmits the RACH preamble using the RACH preamble resource in the RACH preamble resource candidate set associated with the dynamically determined transmission parameter based on the association between the candidates for the transmission parameter (e.g., TBS) and the RACH preamble resource candidate sets.

Thus, in the present embodiment, the TBS of the data part of Message A is implicitly notified from terminal 200 to base station 100 by the RACH preamble resource used for transmission of the RACH preamble in Message A. For example, base station 100 is capable of implicitly identifying the TBS used for the data part of Message A based on the RACH preamble resource used for transmission of the detected RACH preamble.

Thus, the possibility that base station 100 is capable of correctly demodulating and decoding Message A according to the TBS dynamically determined by terminal 200 increases. Further, since explicit notification of the Message-A transmission parameter from terminal 200 to base station 100 is not necessary, overhead can be reduced.

Therefore, according to the present embodiment, for example, it is possible to improve the efficiency of uplink transmission in the 2-step Random access procedure.

[Message A]

Next, Message A in the 2-step Random access procedure will be described.

In Message A, the RACH preamble and the data part may be configured, for example, by Time Division Multiplexing (TDM). Note that, multiplexing configuration between the RACH preamble and the data part of Message A is not limited to TDM, and may be Frequency Division Multiplexing (FDM) or Code Division Multiplexing (CDM).

Further, the data transmitted by terminal 200 in the data part of Message A may include, for example, UP data in addition to C-plane data such as an RRC connection request or a scheduling request. Further, the data transmitted by terminal 200 in the data part of Message A may include the C-Plane data while not including the UP data.

For example, the C-plane data includes an RRC connection request (RRCSetupRequest: 44 bits) at the time of initial access, a request (RRCResumeRequest: 48 bits) for resuming from the RRC_IACTIVE state to the RRC_CONNECTED state, an RRC reconnection request (RRCReestablishmentRequest: 44 bits or RRCReestablishmentRequestl: 64 bits), a scheduling request (Short BSR MAC CE+C-RNTI MAC CE: 24 bits or Long BSR MAC CE+C-RNTI MAC CE: 32 bits or more) at the time when uplink data occurs, an on-demand SI request (RRCSystemInforRequest), and the like. Note that the number of bits for the C-Plane data described above is the number of bits for C-plane data in Release 15 NR, but is not limited to this.

In addition, the C-plane data may also include, for example, a UE-ID. The UE-ID included in Message A includes SAE Temporary Mobile Subscriber Identity (S-TMSI) at the time of RRC connection request, a random bit sequence, a C-RNTI at the time of the RRC_CONNECTED state, a Resume ID at the time of RRC_IACTIVE state, and the like.

Further, the UE-ID may be transmitted in the data part of Message A in conjunction with other C-plane information, or may be transmitted in the UCI. When the UE-ID is transmitted in the UCI, the UE-ID may be included in the UCI including the information on the TBS in below-described Embodiments 3 to 5.

[Message B]

Next, Message B in the 2-step Random access procedure will be described.

Message B may include, for example, a Medium Access Control layer Protocol Data Unit (MAC PDU) including a RACH response (RAR), a MAC PDU including a message (e.g., Contention resolution MAC CE) including a UE-ID for identifying terminal 200, and the like. In addition to the above MAC PDUs, Message B may include a MAC PDU including an RRC signal for RRC connection, RRC resume, or RRC reconnection.

The MAC PDU including an RAR may include information on the transmission timing of uplink transmission by terminal 200, TC-RNTI, or information on resources used by terminal 200 in the uplink.

The information on the resources used in the uplink can be used by terminal 200 having been successful in the Random access procedure, for transmitting to base station 100 a message for completion of the RRC connection, RRC resume, and RRC reconnection when Message B including the MAC PDU including the RRC signal is transmitted. Further, the information on the resources used in the uplink can also be used for transmission of Message 3 for terminal 200 falling back to the 4-step RACH procedure.

In the 4-step Random access procedure, the information on the resources used in the uplink for transmission of Message 3 and the information for reception of Message 4 (e.g., TC-RNTI) need to be included in Message 2 (RAR). On the other hand, in the 2-step Random access procedure, these operations are not necessarily needed. Thus, the information on the resources used in the uplink and the TC-RNTI do not need to be included in Message B (e.g., RAR). In this case, terminal 200 may identify whether or not these pieces of information are included in Message B (RAR) (in other words, the format of the RAR) based on whether or not the MAC PDU including the RRC signal is included in Message B, or terminal 200 may identify, using one bit of a MAC header, whether or not these pieces of information are included in Message B.

Terminal 200 receives Message B based on the UE-ID transmitted in Message A. At this time, a downlink control channel (e.g., Physical Downlink Control Channel (PDCCH)) for scheduling Message B may be scrambled by an RA-RNTI common for all terminals or an UE-specific C-RNTI.

For example, terminal 200 receives a PDCCH scrambled with the RA-RNTI common for all terminals when terminal 200 is in the RRC_IDLE or RRC_INACTIVE state. At this time, the RAR of Message B includes at least the information on the transmission timing of uplink transmission. When Message B does not include the MAC PDU including the RRC signal, the RAR includes the TC-RNTI. On the other hand, when Message B includes the MAC PDU including the RRC signal, no TC-RNTI is required. Message B also includes the MAC PDU including a message (e.g., Contention resolution MAC CE) including a UE-ID for identifying terminal 200.

When terminal 200 is in the RRC_CONNECTED state, terminal 200 receives a PDCCH scrambled with the UE-specific C-RNTI. At this time, the RAR of Message B includes at least the information on the transmission timing of uplink transmission and the information on resources used in the uplink.

When Message B includes the MAC PDU including the RRC signal, the RRC signal includes a relatively large amount of data. Accordingly, applying Hybrid Automatic Repeat Request (HARQ) to the transmission of Message B can improve the utilization efficiency of downlink resources.

On the other hand, group-cast transmission of Message B may be performed when HARQ is not applied to Message B, or when HARQ is applied but the configuration of Message B is not optimized for HARQ. Examples of the configuration of Message B in this case are illustrated in FIGS. 8 and 9. FIG. 8 illustrates an example in which the MAC PDU including an RRC signal is not included in Message B, and FIG. 9 illustrates an example in which the MAC PDU including an RRC signal is included in Message B.

[2-Step Random Access Procedure]

Next, an operation example in the 2-step Random access procedure after transmission of Message A will be described.

Hereinafter, operation example 1 and operation example 2 will be described.

Operation Example 1

Figure 10:
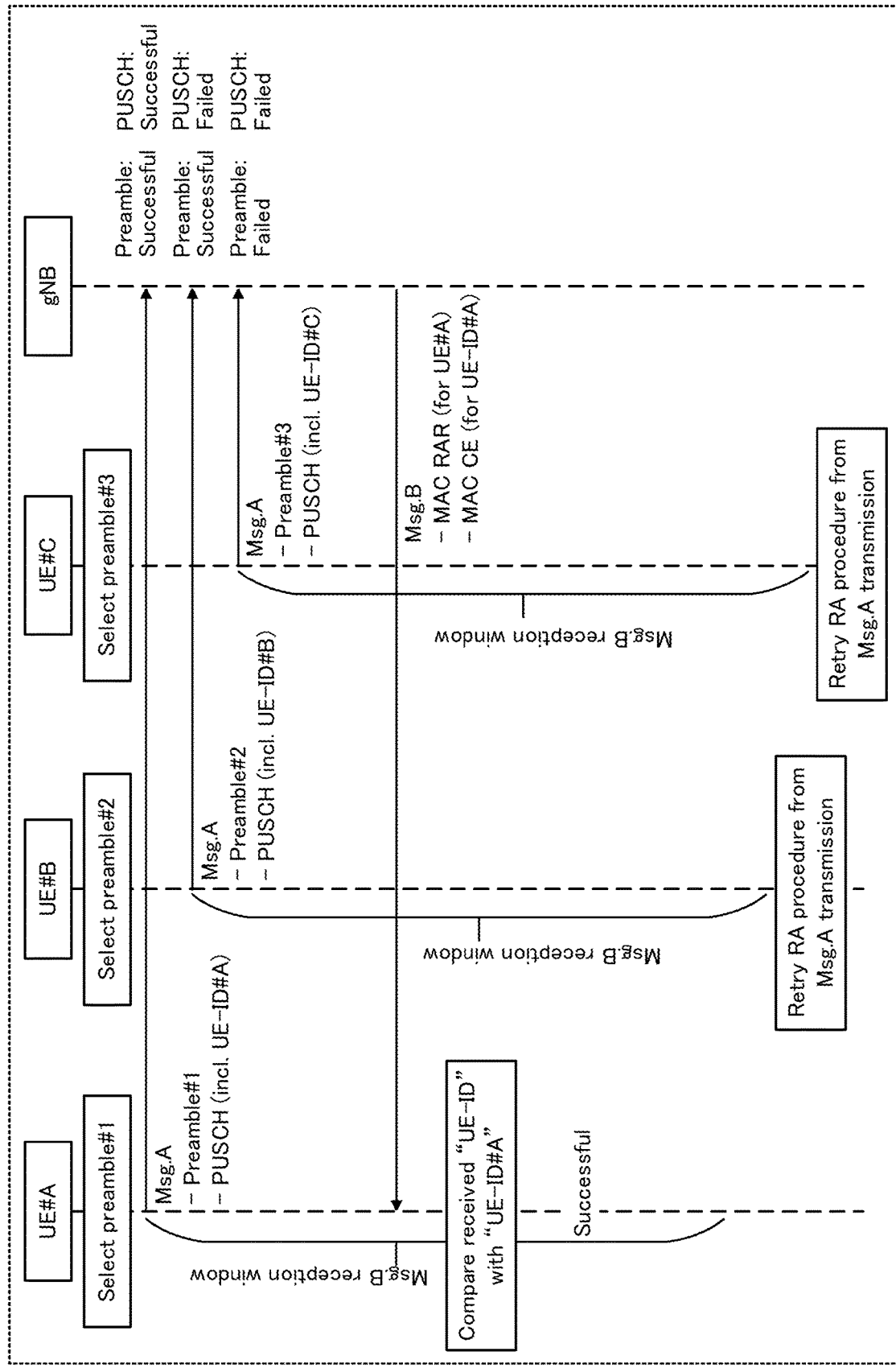
FIG. 10 illustrates an exemplary 2-step Random access procedure.

FIG. 10 illustrates an example of the 2-step Random access procedure in operation example 1.

<Transmission of Message A>

Terminals 200 (UE #A, UE #B, and UE #C in FIG. 10) transmit Messages A as described above, respectively. Each of Messages A includes a RACH preamble and a data part (or UCI+data part). Further, the data part or UCI includes a UE-ID for identifying terminal 200. In addition, terminal 200 operates a Msg. B reception window (which may also be referred to as "RAR reception window") starting from the transmission timing of the RACH preamble.

<Transmission of Message B>

Base station 100 (gNB in FIG. 10) transmits Message B when detecting and correctly decoding Message A. Message B includes, for example, a message (e.g., MAC CE) including a RACH response (referred to as "RAR" or "MAC RAR") and a UE-ID for identifying terminal 200.

On the other hand, base station 100 does not include in Message B the information addressed to terminal 200 having transmitted Message A, when Message A could not be detected (e.g., when the RACH preamble could not be detected) or when Message A could not be decoded correctly (e.g., when the RACH preamble was detected but the data part (e.g., PUSCH) could not be decoded correctly).

For example, in FIG. 10, base station 100 (gNB) detects Message A transmitted by UE #A and correctly decodes detected Message A (Preamble: Successful and PUSCH: Successful). Accordingly, base station 100 includes a RACH response to UE #A and a UE-ID of UE #A in Message B.

On the other hand, in FIG. 10, base station 100 (gNB) detects Message A transmitted by UE #B, but fails to decode Message A correctly (Preamble: Successful and PUSCH: Failed). Further, in FIG. 10, base station 100 (gNB) fails to detect Message A transmitted by UE #C (Preamble: Failed and PUSCH: Failed). Accordingly, base station 100 does not include a RACH response and a UE-ID for each of UE #B and UE #C in Message B.

When terminal 200 (e.g., corresponding to UE #B or UE #C in FIG. 10) having transmitted Message A does not receive Message B including the information addressed to corresponding terminal 200 within the period of the Msg. B reception window, the terminal retransmits Message A.

On the other hand, when terminal 200 (e.g., corresponding to UE #A in FIG. 10) having transmitted Message A receives Message B including the information addressed to corresponding terminal 200 within the period of the Msg. B reception window and when the UE-ID included in Message B matches the UE-ID transmitted in Message A, the terminal determines that the RACH procedure is successful.

Operation Example 2

Figure 11:
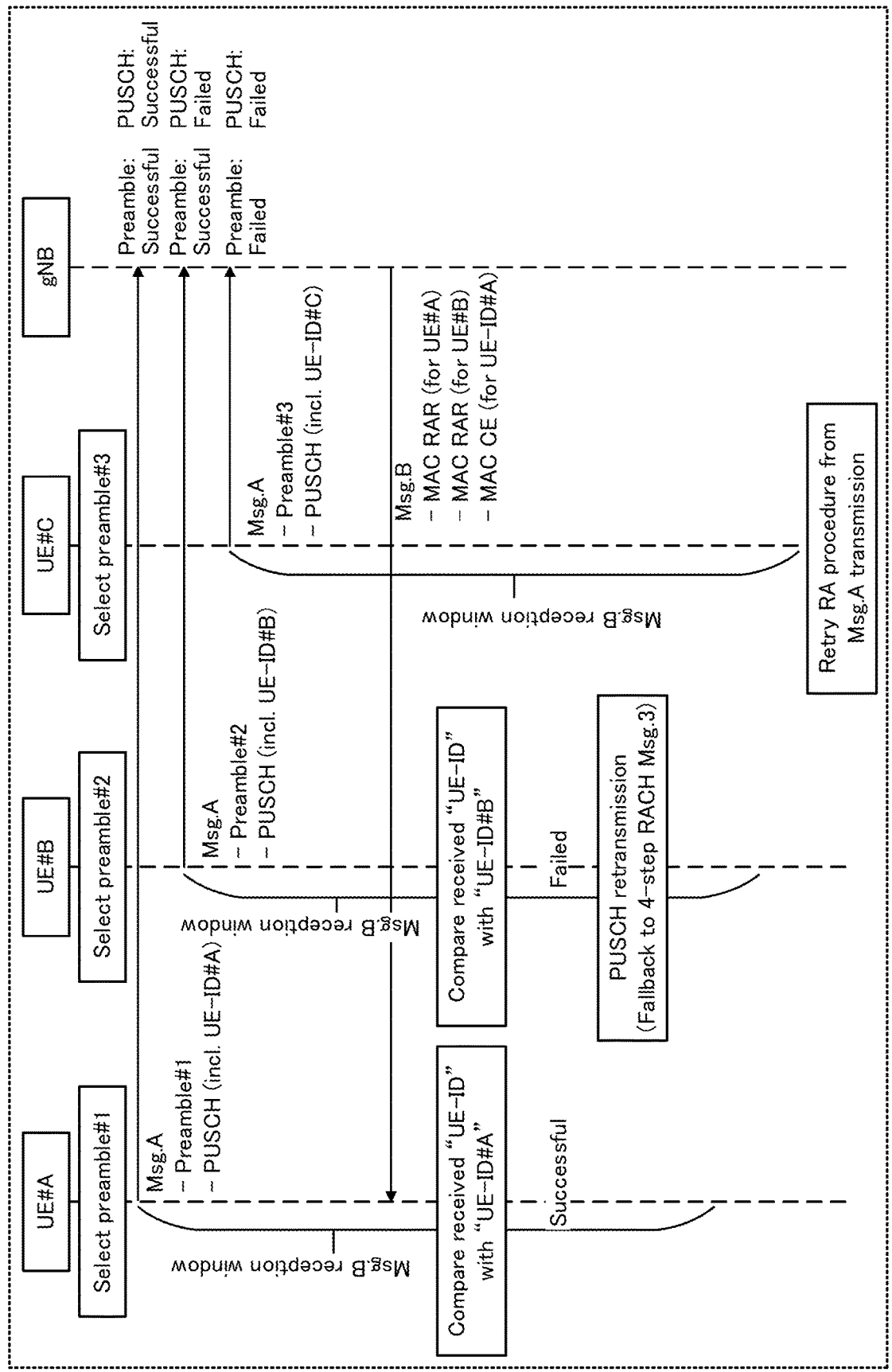
FIG. 11 illustrates an exemplary 2-step Random access procedure.

FIG. 11 illustrates an example of the 2-step Random access procedure in operation example 2.

<Transmission of Message A>

Terminals 200 (UE #A, UE #B, and UE #C in FIG. 11) transmit Messages A as described above, respectively. Each of Messages A includes a RACH preamble and a data part (or UCI+data part). Further, the data part or UCI includes a UE-ID for identifying terminal 200. Further, terminal 200 operates the Msg. B reception window starting from the transmission timing of the RACH preamble.

<Transmission of Message B>

Base station 100 (gNB in FIG. 11) transmits Message B when detecting and correctly decoding Message A. Message B includes, for example, a message (e.g., MAC CE) including a RACH response (referred to as "RAR" or "MAC RAR") and a UE-ID for identifying terminal 200. For example, in FIG. 11, base station 100 (gNB) detects Message A transmitted by UE #A and correctly decodes detected Message A (Preamble: Successful and PUSCH: Successful). Accordingly, base station 100 includes a RACH response to UE #A and a UE-ID of UE #A in Message B.

Base station 100 also transmits Message B when detecting the RACH preamble of Message A but failing to correctly decode the data part. At this time, Message B includes the RACH response (referred to as "RAR" or "MAC RAR"). Note that, with respect to terminal 200 having transmitted the corresponding RACH preamble, the RAR includes a retransmission request for the data part and information on resources used in the uplink. However, when base station 100 detects the RACH preamble but fails to correctly decode the data part, base station 100 cannot identify terminal 200 having transmitted the RACH preamble at this point. Accordingly, Message B does not include a message including the UE-ID for identifying corresponding terminal 200. Terminal 200 for which the RACH preamble has been detected by base station 100 but the data part has not been decoded correctly is caused to fall back, for example, to the 4-step RACH procedure.

For example, in FIG. 11, base station 100 detects Message A transmitted by UE #B but fails to correctly decode Message A (Preamble: Successful and PUSCH: Failed). Thus, base station 100 includes a RACH response to UE #B in Message B, but does not include a UE-ID to UE #B in Message B.

Further, when base station 100 fails to detect Message A (e.g., when base station 100 fails to detect the RACH preamble), base station 100 does not include, in Message B, the information addressed to terminal 200 having transmitted Message A. For example, in FIG. 10, base station 100 fails to detect Message A transmitted by UE #C (Preamble: Failed and PUSCH: Failed). Accordingly, base station 100 does not include a RACH response to UE #C and a UE-ID of UE #C in Message B.

When terminal 200 (e.g., corresponding to UE #C in FIG. 11) having transmitted Message A does not receive Message B including the information addressed to corresponding terminals 200 within the period of the Msg. B reception window, the terminal retransmits Message A.

On the other hand, when terminal 200 (e.g., corresponding to UE #B in FIG. 11) having transmitted Message A receives Message B including the information addressed to corresponding terminals 200 within the period of Msg. B reception window but when the UE-ID included in Message B does not match the UE-ID transmitted in Message A, the terminal performs uplink transmission corresponding to Message 3 of the 4-step RACH procedure in accordance with the information included in the RAR in corresponding Message B. In other words, UE #B is caused to fall back to the 4-step Random access procedure.

In addition, when terminal 200 (e.g., corresponding to UE #A in FIG. 11) having transmitted Message A receives Message B including the information addressed to corresponding terminals 200 within the period of the Msg. B reception window and when the UE-ID included in Message B matches the UE-ID transmitted in Message A, the terminal determines that the RACH procedure is successful.

The operation examples in the 2-step Random access procedure after transmission of Message A have been described above.

Note that, in operation example 1 and operation example 2, the period configured as the Msg. B reception window may be different depending on the type of service or traffic, for example. For example, for eMBB or mMTC where the latency requirements are looser, the period configured as the Msg. B reception window may be longer, and for URLLC where the latency requirements are stricter, the period configured as the Msg. B reception window may be shorter.

Further, in operation example 1 and operation example 2, Message B may include information (Back-off) specifying the waiting time for retransmission. For example, terminal 200 is capable of controlling retransmission of Message A based on the information specifying the waiting time for retransmission even when Message B does not include the information addressed to corresponding terminal 200 (e.g., RAR or UE-ID). At this time, for example, terminal 200 having stricter latency requirements (e.g., URLLC terminal) may, instead of using Back-off specified by base station 100, configure shorter back-off (or back-off of 0) than the specified back-off for retransmission to initiate retransmission of Message A.

Embodiment 2

Since a base station and a terminal according to the present embodiment have the same basic configurations as base station 100 and terminal 200 according to Embodiment 1, they will be described with reference to FIGS. 4 and 5.

Embodiment 1 has been described in which the TBS of the data part of Message A (in other words, one transmission parameter) is associated with the Message-A RACH preamble resource candidate set. Unlike this, the present embodiment will be described in which a plurality of transmission parameters of the data part of Message A are associated with the Message-A RACH preamble resource set.

The plurality of transmission parameters of the data part of Message A may include, for example, the TBS and resource information (e.g., at least one of a resource position and a resource amount). Note that the transmission parameters are not limited to the TBS and resource information, and may be other parameters (an example of which will be described later).

For example, base station 100 indicates terminal 200 of a plurality of combinations of the association between, on one hand, the TBS of the data part of Message A and the resource information and, on the other hand, the RACH preamble resource candidate set by using the higher layer signalling (e.g., corresponding to ST101 of FIG. 6). The higher layer signalling may be, for example, cell- or group-specific broadcast information (e.g., SIB) or may be an UE-specific RRC signal.

Terminal 200 selects the TBS of the data part of Message A from among a plurality of TBSs configured by base station 100. Terminal 200 may select the TBS of the data part of Message A, for example, based on the data amount (e.g., Buffer value) of the data part that is actually transmitted. At this time, the Buffer value used as a reference for TBS selection may be, for example, the UP data amount, or the data amount equal to the sum of C-plane data such as the RRC connection request, scheduling request, or the like and the UP data.

Further, in the method of selecting the TBS based on the Buffer value, the TBS with a smaller zero-padding amount may be selected. It is thus possible to improve the use efficiency of resources for the data part of Message A.

Further, from the RACH preamble resource candidate set associated with the selected TBS, terminal 200 selects a RACH preamble resource to be actually used. In addition, terminal 200 identifies the resource information (e.g., at least one of the resource position and the resource amount) of the data part of Message A that is associated with the selected TBS.

FIG. 12 illustrates an example of the association between, on one hand, the TBS and the resource information of the data part (e.g., the resource position and resource amount of time resources and frequency resources) and, on the other hand, the RACH preamble resource candidate set.

FIG. 12 also illustrates, by way of example, the association for a method for terminal 200 to select the TBS based on the data amount (e.g., Buffer value) of the data part of Message A.

In FIG. 12, TBS=$X_1$, RACH preamble resource candidate set $Z_1$, and resource information "Resource 1" of the data part are associated with one another, and TBS=$X_2$, RACH preamble resource candidate set $Z_2$, and resource information "Resource 2" of the data part are associated with one another, and TBS=$X_3$, RACH preamble resource candidate set $Z_3$, and resource information "Resource 3" of the data part are associated with one another. Note that, the number of candidates for the TBS and the resource information associated with the RACH preamble resource set is not limited to three, and may be two, four, or more.

For example, in FIG. 12, terminal 200 selects TBS=$X_1$ (and RACH preamble resource candidate set $Z_1$ and Resource 1) when the Buffer value is $Y_1$ or less, selects TBS=$X_2$ (and RACH preamble resource candidate set $Z_2$ and Resource 2) when the Buffer value is $Y_2$ or less, and selects TBS=$X_3$ (and RACH preamble resource candidate set $Z_3$ and Resource 3) when the Buffer value is $Y_3$ or less.

Terminal 200 may generate Message A including a signal of the data part (e.g., at least one of C-Plane data and UP data) of Message A generated using the selected TBS and resource information, and the RACH preamble generated using the selected RACH preamble resource. Terminal 200 transmits generated Message A to base station 100.

Note that, the RACH preamble and the data part of Message A may be configured, for example, by TDM, FDM, or CDM. Further, the data transmitted by terminal 200 in the data part of Message A may include, for example, UP data in addition to C-plane data such as an RRC connection request or a scheduling request. Alternatively, the data transmitted by terminal 200 in the data part of Message A may, for example, include the C-Plane data while not including the UP data.

When detecting the RACH preamble included in Message A transmitted by terminal 200, base station 100 identifies the TBS and resource information of the data part of Message A transmitted by terminal 200, from the RACH preamble resource corresponding to detected RACH preamble based on the association between the Message-A transmission parameters (e.g., TBS and resource information) and the RACH preamble resource set.

Base station 100 demodulates and decodes the data part of Message A corresponding to the detected RACH preamble using the TBS and resource information identified. Then, for example, base station 100 transmits Message B to terminal 200 after reception processing of Message A.

As described above, in the present embodiment, terminal 200 dynamically determines the parameters (transmission parameters) relevant to transmission of the data part of Message A including the RACH preamble and the data part. Thus, terminal 200 is capable of appropriately selecting the transmission parameters (e.g., TBS and resource position) used for the data part of Message A depending on the generated transmission packet.

In addition, in the present embodiment like Embodiment 1, terminal 200 notifies base station 100 of the determined transmission parameters using Message A. For example, in the present embodiment, terminal 200 transmits the RACH preamble using the RACH preamble resource in the RACH preamble resource candidate set associated with the transmission parameters dynamically determined based on the association between the candidates for the transmission parameters (e.g., TBS and resource information) and the RACH preamble resource candidate sets.

Thus, for example, base station 100 is capable of implicitly identifying the TBS and resource information used for the data part of Message A based on the RACH preamble resource used for transmission of the detected RACH preamble. Accordingly, the possibility that base station 100 is capable of correctly demodulating and decoding Message A according to the transmission parameters (e.g., TBS and resource information) dynamically determined by terminal 200 increases. Further, since explicit notification of the Message-A transmission parameters from terminal 200 to base station 100 is not necessary, overhead can be reduced.

Further, in the present embodiment, base station 100 is capable of configuring the association between a plurality of Message-A transmission parameters (e.g., TBS and resource information of the data part) and the RACH preamble resource candidate set. Thus, for example, in the case of contention-based RACH, base station 100 is capable of easily controlling the collision probability of collision between the RACH preamble resources or the resources of the data part by configuring the above-described association depending on, for example, the bandwidth available to the system, the traffic condition in the cell, or the like.

Note that, in the association between the RACH preamble resource candidate set and the transmission parameters (e.g., TBS and resource information) in the present embodiment, all information pieces of the transmission parameters may be associated with the RACH preamble resource candidate set, or some of the information pieces may be associated with the RACH preamble resource set.

[Variation 1]

In Embodiment 2, the transmission parameters associated with the RACH preamble resource candidate set are not limited to the TBS and the resource information of the data part. Additional parameters relevant to transmission of Message A may be associated with the RACH preamble resource candidate set.

Variation 1 will be described in relation to an example of additional parameters associated with the RACH preamble resource candidate set.

<Association with MCS of Data Part of Message A>

Generally, selectable RACH preamble resource candidates are different between a case where a path loss between base station 100 and terminal 200 is equal to or greater than a threshold, and a case where the path loss is less than the threshold.

For example, terminal 200 measures the path loss between base station 100 and terminal 200 using a downlink signal or downlink channel. Then, from a RACH preamble resource candidate set associated with the measured path loss, terminal 200 may select a RACH preamble resource to be actually used.

Terminal 200 selects the MCS of the data part of Message A associated with the selected RACH preamble resource candidate set (in other words, path loss). For example, when the path loss is greater than or equal to the threshold, terminal 200 may use a lower MCS for the data part of Message A. On the other hand, when the path loss is less than the threshold, terminal 200 uses a higher MCS for the data part of Message A. It is thus possible for terminal 200 to appropriately control the transmission quality of Message A depending on the condition of the propagation path, so as to improve the transmission efficiency of Message A.

Further, each RACH preamble resource candidate set associated with the path loss and the MCS may be associated with a subgroup associated with the TBS or resource information (e.g., at least one of a resource position and a resource amount) of the data part.

For example, FIG. 13 illustrates an example in which the RACH preamble resource candidate sets associated with the path loss and the MCS are sub-grouped by the association between the TBS and the RACH preamble resource candidate set (including TBS selection by terminal 200 based on the Buffer value). In FIG. 13, the RACH preamble resource sets are grouped into a group in the case of a path loss greater than threshold Th (MCS $A_1$) and a group in the case of a path loss less than or equal to threshold Th (MCS $A_2$). Each of the groups illustrated in FIG. 13 includes a combination of TBS=$X_1$ and RACH preamble resource candidate set $Z_1$, and a combination of TBS=$X_2$ and RACH preamble resource candidate set $Z_2$. Note that FIG. 13 is an example, and the resource information of the data part may be included, for example.

<Association with Transmit Power of Message A>

For example, the RACH preamble resource candidate set and the transmit power of Message A may be associated with each other.

For example, the transmit power of Message A may be different depending on the RACH preamble resource set associated with the TBS. For example, when the RACH preamble is selected from the RACH preamble resource set associated with TBS=$X_1$, terminal 200 configures $P_1$ as the transmit power of Message A. Further, when the RACH preamble is selected from the RACH preamble resource set associated with TBS=$X_2$, terminal 200 configures $P_2$ as the transmit power of Message A.

Here, the larger the TBS is, the higher the transmit power is configured. For example, when $X_1<X_2$, the relation $P_1<P_2$ holds true. The larger the TBS, the lower the use efficiency of uplink resources becomes when retransmission occurs. On the other hand, the above-described association between the RACH preamble resource set and the transmit power makes it possible to configure higher transmit power for transmission of a larger TBS, for example. It is thus possible to prevent frequent occurrence of retransmission, so as to improve the transmission efficiency of Message A.

Note that, the parameter relevant to the transmit power associated with the RACH preamble resource candidate set is not limited to the transmit power, and may be, for example, the amount of power increase per retransmission of Message A.

<Association with Rank of Data Part of Message A>

For example, the RACH preamble resource candidate set and the number of transmission ranks of the data part of Message A may be associated with each other.

For example, the number of transmission ranks of the data part of Message A may be different depending on the RACH preamble resource set associated with the TBS. Using different transmission ranks makes it possible, for example, to apply Multi-input Multi-output (MIMO) spatial multiplexing transmission to the transmission of Message A, so as to improve the transmission efficiency of Message A.

[Variation 2]

The TBS associated with the RACH preamble resource candidate set in Embodiment 2 may be the maximum TBS that can be transmitted (or configured) by terminal 200.

Further, for example, as illustrated in FIG. 14, a plurality of TBSs (e.g., allowable TBSs) equal to or less than each of the maximum TBSs may be associated with each RACH preamble resource candidate set. In this case, terminal 200 may select a TBS based on, for example, the amount (e.g., Buffer value) of UP data actually transmitted.

Note that, the Buffer value used for TBS selection may be the UP data amount, or the sum of the data amount of the UP data and the C-plane data such as the RRC connection request, scheduling request, or the like. Further, as a method of selecting the TBS based on the Buffer value, a TBS with the smallest zero-padding amount may be selected. It is thus possible to flexibly cope with the transmissions of various amounts of UP data while efficiently configuring RACH resources.

In addition, when base station 100 detects the RACH preamble, base station 100 identifies, from the RACH preamble resource corresponding to the detected RACH preamble, the maximum TBS that terminal 200 may use for transmission of Message A, or a plurality of TBS candidates that are less than or equal to the maximum TBS. For example, base station 100 performs blind decoding on the plurality of identified TBS candidates, and demodulates and decodes the data part of Message A.

[Variation 3]

The number of RACH preamble resources included in the RACH preamble resource candidate set in Embodiment 2 may be different for each of the RACH preamble resource candidate sets.

For example, as illustrated in FIG. 15, the number of RACH preamble resources included in RACH preamble resource candidate set $Z_1$ associated with TBS=$X_1$ may be configured to N1, the number of RACH preamble resources included in RACH preamble resource candidate set $Z_2$ associated with TBS=$X_2$ may be configured to N2, and the number of RACH preamble resources included in RACH preamble resource candidate set $Z_3$ associated with TBS=$X_3$ may be configured to N3.

In FIG. 15, $X_1<X_2<X_3$ and N1<N2<N3. That is, the larger the TBS is, the larger the number of RACH preamble resources included in the RACH preamble resource candidate set is configured. The larger the number of RACH preamble resources included in the RACH preamble candidate set is, the greater the reduction in probability of collision between the RACH preambles can be. The larger the TBS, the greater the decrease in utilization efficiency of uplink resources becomes when retransmission occurs. On the other hand, in FIG. 15, for example, a larger number of RACH preamble resources are configured for transmission of a larger TBS. It is thus possible to prevent frequent occurrence of retransmission, so as to improve the transmission efficiency of Message A.

Note that, depending on the traffic conditions of terminals included in a cell, it is probable that those terminals which transmit a large amount of UP data are fewer than those terminals which transmit a small amount of UP data. Thus, the smaller the TBS, the smaller the number of RACH preamble resources included in the RACH preamble resource candidate set may be configured.

[Variation 4]

A synchronization signal in NR is composed of, for example, two signals of Primary Synchronization Signal (PSS) and Secondary Synchronization Signal (SSS) (see, e.g., NPL 1). Specifically, in the high frequency band of 6 GHz or higher, it is conceivable, for example, to apply transmission beamforming at the base station side in order to secure the communicable distance and area between the base station and the terminal Further, in NR, the synchronization signal and a broadcast channel (Physical Broadcast Channel (PBCH)) are defined as one unit (e.g., referred to as "SS/PBCH block"). One SS/PBCH block is transmitted by transmission beams in the same direction, and a configuration (beam sweeping) in which beams are successively switched and transmitted is supported. However, for a low frequency band or the like, a configuration in which a single SS/PBCH block is transmitted with a single beam pattern without applying beam sweeping is possible.

When beamforming is applied to an SS/PBCH block, equivalent reception beamforming is applied at the base station side in order to receive the RACH from a terminal having received the SS/PBCH block. To that end, the terminal transmits the RACH in the RACH preamble resource associated with the detected SS/PBCH block (e.g., see NPL 6). Further, measurement using a channel-state estimation reference signal (Channel State Information Reference Signal (CSI-RS)) may be configured for the terminal, and the CSI-RS and the RACH preamble resource may be associated with each other (see, e.g., NPL 6).

In Variation 4, terminal 200 measures received quality (e.g., referred to as "Reference Signal Received Power (SS-RSRP)" or CSI-RSRP) using, for example, the SS/PBCH block or CSI-RS. Then, when there are more than one SS/PBCH blocks or CSI-RSs for which the SS-RSRP or CSI-RSRP is equal to or greater than the threshold, terminal 200 selects one SS/PBCH block or CSI-RS from among the SS/PBCH blocks or CSI-RSs and selects the RACH preamble from the RACH preamble resource candidate set associated with the SS/PBCH block or CSI-RS. Note that terminal 200 may select the SS/PBCH or CSI-RS corresponding to any SS-RSRP or CSI-RSRP when there is no SS/PBCH block or CSI-RS for which the SS-RSRP or CSI-RSRP is greater than or equal to the threshold.

At this time, terminal 200 may select the SS/PBCH block or CSI-RS depending on the TBS (in other words, the transmission parameter of the data part of Message A). For example, terminal 200 may use a different threshold for the SS-RSRP or CSI-RSRP depending on the TBS. For example, terminal 200 configures a higher threshold for the SS-RSRP or CSI-RSRP with increasing TBS. In this case, terminal 200 may select a higher quality beam pattern for transmission of a larger TBS. Thus, it is possible to prevent frequent occurrence of retransmission of the transmission of a larger TBS that reduces the utilization efficiency of uplink resources when retransmission occurs. It is thus possible to improve the transmission efficiency of Message A.

Embodiment 3

Since a base station and a terminal according to the present embodiment have the same basic configurations as base station 100 and terminal 200 according to Embodiment 1, they will be described with reference to FIGS. 4 and 5.

In the present embodiment, terminal 200 includes information on the TBS of the data part of Message A in UCI and notifies base station 100 of the information during the 2-step Random access procedure.

Figure 16:
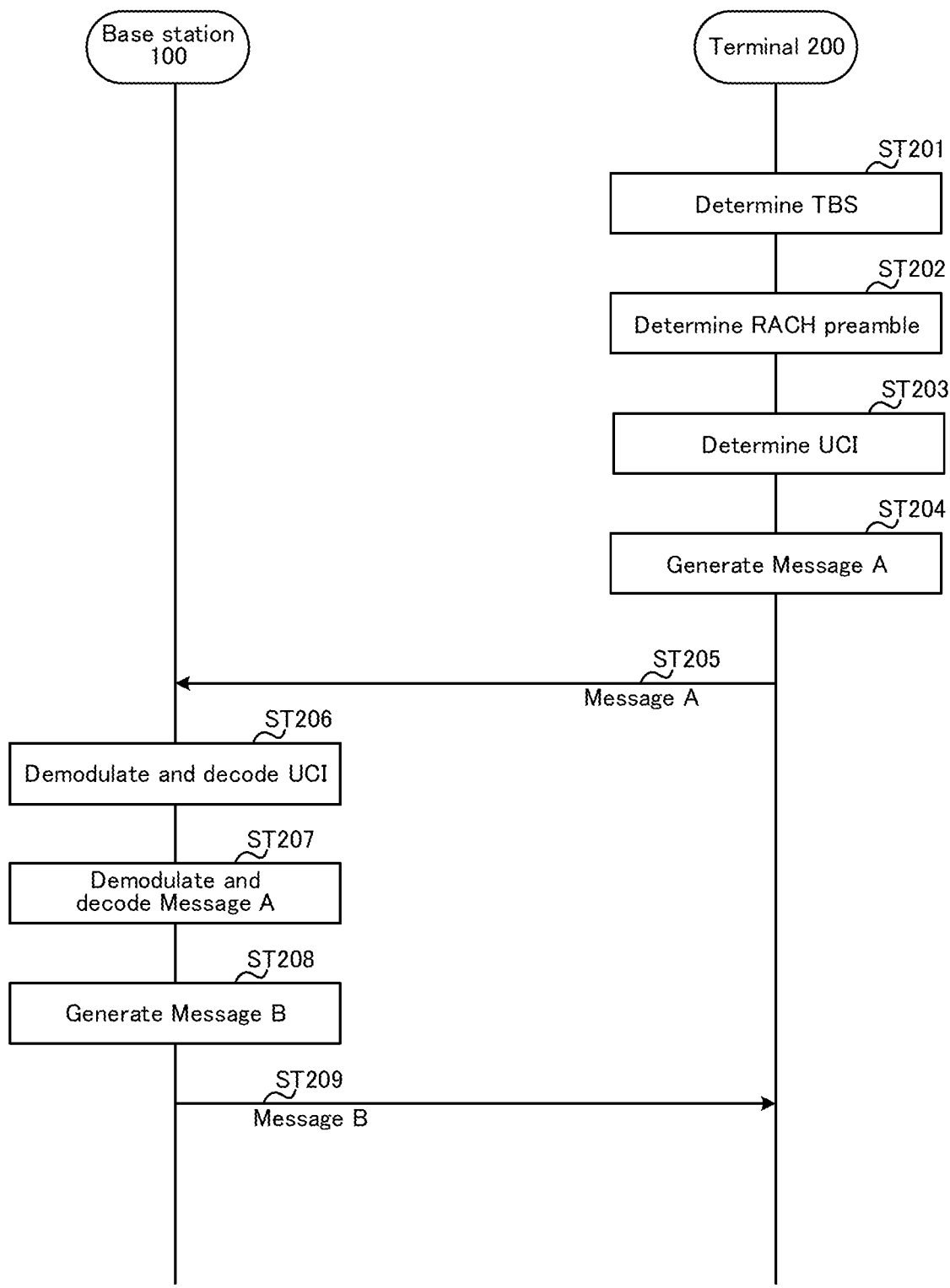
FIG. 16 is a sequence diagram illustrating an operation example of the base station and the terminal according to Embodiment 3.

FIG. 16 illustrates an example of a flow of processing in base station 100 and terminal 200 according to the present embodiment.

Note that, in the present embodiment, base station 100 may indicate terminal 200 of a plurality of combinations of, for example, the association between the transmission parameter (e.g., TBS or resource information) of the data part of Message A and a UCI bit field (e.g., see FIG. 17 described later) by using the higher layer signalling. The higher layer signalling is, for example, cell- or group-specific broadcast information (e.g., SIB) or an UE-specific RRC signal.

When a transmission packet (in other words, uplink signal) occurs, terminal 200 determines the TBS of the data part of Message A (ST201). For example, a plurality of TBSs may be specified in advance in the specifications as TBSs that can be selected by terminal 200, or base station 100 may configure the TBSs using a higher layer signalling (e.g., SIB or an UE-specific RRC signal). For example, terminal 200 dynamically determines the TBS of the data part of Message A from among the specified or configured TBSs.

Terminal 200 determines the RACH preamble to be transmitted (ST202). For example, from among a plurality of RACH preamble resource candidate sets, terminal 200 selects a RACH preamble resource candidate set to be actually used, and selects a RACH preamble used for Message A from the selected RACH preamble resource candidate set. Note that, for example, selection based on the path loss between base station 100 and terminal 200 or selection based on the SS/PBCH block or CSI-RS may be applied as the selection of the RACH preamble resource candidate set, but the selection method is not limited to these selection methods.

Terminal 200 determines the value (e.g., index) of the UCI to be included in Message A (ST203). For example, terminal 200 generates the UCI including the index associated with the information on the TBS of the data part of Message A.

Figure 17:
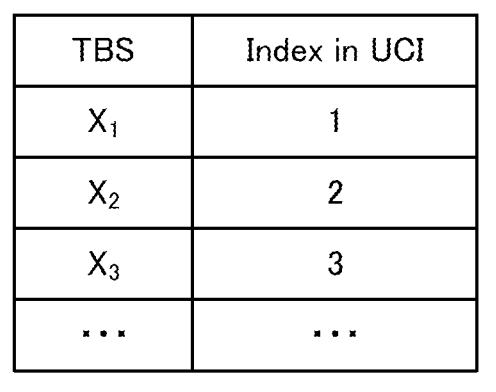

FIG. 17 illustrates an example of the association between the TBS and the UCI bit field. In FIG. 17, for example, index 1 is configured in the UCI bit field when TBS=$X_1$ is selected, index 2 is configured in the UCI bit field when TBS=$X_2$ is selected, and index 3 is configured in the UCI bit field when TBS=$X_3$ is selected. Note that the number of TBSs configured is not limited to three, and may be, for example, two, four, or more.

In FIG. 16, terminal 200 generates Message A (ST204). For example, terminal 200 generates the data part of Message A using the selected TBS. Further, terminal 200 multiplexes the data part of Message A with the UCI including the index corresponding to information on the TBS. Further, for example, terminal 200 generates the RACH preamble of Message A using the selected RACH preamble resource.

Terminal 200 transmits generated Message A to base station 100 (ST205).

The data transmitted by terminal 200 in the data part of Message A may include, for example, UP data in addition to C-plane data such as an RRC connection request, a scheduling request, or the like. In addition, the data transmitted by terminal 200 in the data part of Message A may include the C-Plane data while not including the UP data.

Base station 100 demodulates and decodes the UCI included in Message A transmitted by terminal 200, to identify the TBS used by terminal 200 to transmit Message A (ST206).

Base station 100 demodulates and decodes the data part of Message A using the identified TBS (ST207).

After reception processing of Message A, base station 100 generates Message B (ST208), and transmits generated Message B to terminal 200 (ST209).

As described above, in the present embodiment, terminal 200 dynamically determines the parameter (transmission parameter) relevant to transmission of the data part of Message A (in other words, random access signal) including the RACH preamble and the data part. Thus, terminal 200 is capable of appropriately selecting the transmission parameter (e.g., TBS, resource position, or resource amount) used for the data part of Message A depending on the generated transmission packet.

In addition, in the present embodiment, terminal 200 notifies base station 100 of the determined transmission parameter using Message A. For example, in the present embodiment, terminal 200 transmits Message A including the UCI indicating information on the transmission parameter (e.g., TBS) to base station 100. That is, in the present embodiment, terminal 200 explicitly notifies base station 100 of the TBS of the data part of Message A by the UCI included in Message A. For example, base station 100 is capable of identifying the TBS used for the data part of Message A based on the received UCI.

Thus, the possibility that base station 100 is capable of correctly demodulating and decoding Message A according to the TBS dynamically determined by terminal 200 increases.

Further, in the present embodiment, a plurality of RACH preamble resource candidate sets associated with the transmission parameters of the data part of Message A as in Embodiments 1 and 2 are not required. In other words, in the present embodiment, for example, only one RACH preamble resource candidate set is enough for terminal 200. Thus, according to the present embodiment, it is possible to configure the RACH preamble resources efficiently.

Note that, the present embodiment has been described in which the TBS of the data part of Message A is used as an exemplary Message-A transmission parameter, but the Message-A transmission parameter is not limited to the TBS and may be other parameters. For example, the resource information (e.g., at least one of the resource position and the resource amount) of the data part of Message A may be associated with the Message-A RACH preamble resource candidate set.

Embodiment 4

Since a base station and a terminal according to the present embodiment have the same basic configurations as base station 100 and terminal 200 according to Embodiment 1, they will be described with reference to FIGS. 4 and 5.

In the present embodiment, terminal 200 includes information on the TBS of the data part of Message A in the UCI and notifies base station 100 of the information during the 2-step Random access procedure as in Embodiment 3.

In the present embodiment, the transmission parameters included in the UCI may include the resource information (e.g., at least one of the resource position and the resource amount) of the data part of Message A in addition to the TBS of the data part of Message A.

In the present embodiment, the resource information (e.g., at least one of the resource position and the resource amount) in the UCI transmitted by Message A may be associated with the Message-A RACH preamble resource (or the RACH preamble resource candidate set).

For example, base station 100 indicates terminal 200 of a plurality of combinations of the association between the TBS of the data part of Message A and the UCI bit field (e.g., index) and the association between the resource information of the UCI and the RACH preamble resource (or RACH Preamble resource candidate set) by using the higher layer signalling. The higher layer signalling is, for example, cell- or group-specific broadcast information (e.g., SIB) or an UE-specific RRC signal.

Terminal 200 dynamically determines the TBS of the data part of Message A from among a plurality of TBSs (TBS candidates) configured by base station 100, for example.

Terminal 200 may select the TBS of the data part of Message A, for example, based on the amount (e.g., Buffer value) of UP data that is actually transmitted. Note that, the Buffer value used as a reference for TBS selection may be, for example, the UP data amount, or the data amount equal to the sum of C-plane data such as the RRC connection request, scheduling request, or the like and UP data. Further, in the method of selecting the TBS based on the Buffer value, the TBS with a smaller zero-padding amount may be selected. It is thus possible to improve the use efficiency of resources for the data part of Message A.

In addition, as in Embodiment 3, terminal 200 generates UCI indicating the information on the TBS of the data part of Message A. For example, terminal 200 generates the UCI including the index associated with the information on the TBS of the data part of Message A.

FIG. 18 illustrates an example of the association between the TBS and the UCI bit field. FIG. 18 also illustrates the association related to a method of selecting the TBS based on the Buffer value of terminal 200.

In FIG. 18, for example, index 1 is configured in the UCI bit field when TBS=$X_1$ is selected, index 2 is configured in the UCI bit field when TBS=$X_2$ is selected, and index 3 is configured in the UCI bit field when TBS=$X_3$ is selected. Note that the number of TBSs configured is not limited to three, and may be, for example, two, four, or more.

For example, in FIG. 18, terminal 200 selects TBS=$X_1$ (and index 1 in the UCI bit field) when the Buffer value is less than or equal to $Y_1$, selects TBS=$X_2$ (and index 2 in the UCI bit field) when the Buffer value is less than or equal to $Y_2$, and selects TBS=$X_3$ (and index 3 in the UCI bit field) when the Buffer value is less than or equal to $Y_3$.

Further, for example, from the RACH preamble resource candidate set, terminal 200 selects a RACH preamble resource to be actually used. Further, terminal 200 identifies the resource information (e.g., at least one of the resource position and the resource amount) of the UCI of Message A from the selected RACH preamble resource based on, for example, the association between the resource information of the UCI and the RACH preamble resource.

For example, terminal 200 generates the data part of Message A using the selected TBS. Further, terminal 200 multiplexes the data part of Message A with the UCI including the index corresponding to information on the TBS. The UCI is mapped to the data part of Message A, for example, based on the resource position and the resource amount associated with the Message-A RACH preamble resource (or RACH preamble resource candidate set). Further, for example, terminal 200 generates the RACH preamble of Message A using the selected RACH preamble resource.

Note that, the RACH preamble resource of Message A and the data part of Message A may be configured, for example, by TDM, FDM, or CDM. The data transmitted by terminal 200 in the data part of Message A may include, for example, UP data in addition to C-plane data such as an RRC connection request, a scheduling request, or the like. Alternatively, the data transmitted by terminal 200 in the data part of Message A may include, for example, the C-plane data such as the RRC connection request, scheduling request, or the like while not including the UP data.

Terminal 200 transmits generated Message A to base station 100.

When detecting the RACH preamble, base station 100 identifies the resource information used by terminal 200 for UCI transmission of Message A, from the RACH preamble resource corresponding to the detected RACH preamble. Further, base station 100 is capable of identifying the TBS and the resource information of the data part used by terminal 200 for transmission of Message A by demodulating and decoding the UCI by using the identified resource information of the UCI.

Base station 100 demodulates and decodes the data part of Message A corresponding to the detected RACH preamble using the identified TBS and the identified resource information of the data part. After reception processing of Message A, base station 100 generates Message B, and transmits generated Message B to terminal 200.

As described above, in the present embodiment, terminal 200 dynamically determines the parameters (transmission parameters) relevant to transmission of the data part of Message A including the RACH preamble and the data part. Thus, terminal 200 is capable of appropriately selecting the transmission parameters (e.g., TBS and resource information) used for the data part of Message A depending on the generated transmission packet.

In addition, in the present embodiment like Embodiment 3, terminal 200 transmits Message A including the UCI indicating the information on the transmission parameters (e.g., TBS and resource information) to base station 100. That is, in the present embodiment, terminal 200 explicitly notifies base station 100 of the TBS and resource information of the data part of Message A by the UCI included in Message A. For example, base station 100 is capable of identifying the TBS and resource information used for the data part of Message A based on the received UCI.

Thus, the possibility that base station 100 is capable of correctly demodulating and decoding Message A according to the TBS and resource information dynamically determined by terminal 200 increases.

Further, in the present embodiment, a plurality of RACH preamble resource candidate sets associated with the transmission parameter(s) of the data part of Message A as in Embodiments 1 and 2 are not required. In other words, in the present embodiment, for example, only one RACH preamble resource candidate set is enough for terminal 200. Thus, according to the present embodiment, it is possible to configure the RACH preamble resource efficiently.

Further, in the present embodiment, base station 100 configures the association between the resource information of the UCI of Message A and the RACH preamble resource candidate set. Thus, for example, in the case of contention-based RACH, base station 100 is capable of easily controlling the collision probability of collision between the RACH preamble resources or the resources of the data part by configuring the above-described association depending on the bandwidth available to the system, the traffic condition in the cell, or the like.

[Variation 1]

The information notified from terminal 200 to base station 100 by the UCI in Embodiment 4 is not limited to the TBS and the resource information of the data part, but may also be other parameters relevant to the transmission of Message A. For example, the information on the transmit power of Message A, MCS, or information on the number of transmission ranks of the data part of Message A may be included in the UCI.

[Variation 2]

The transmission method for transmitting the UCI is not limited to multiplexing of the UCI and the data part of Message A. For example, a method for transmitting the UCI using an uplink control channel (Physical Uplink Control Channel (PUCCH)) may also be employed.

The RACH preamble of Message A, the data part of Message A, and the PUCCH for transmitting the UCI may be configured, for example, by TDM, FDM, or CDM.

The information on a PUCCH format, resource position, and resource amount for transmitting the UCI may be associated with, for example, the RACH preamble resource candidate set. Accordingly, base station 100 is capable of identifying in advance the UCI transmission method and the radio resource for transmission of the UCI, and thus is capable of correctly demodulating and decoding the UCI.

Embodiment 5

Since a base station and a terminal according to the present embodiment have the same basic configurations as base station 100 and terminal 200 according to Embodiment 1, they will be described with reference to FIGS. 4 and 5.

In the present embodiment, terminal 200 notifies of the information on the TBS and the resource information of the data part of Message A by combining implicit notification in which the information on the TBS and the resource information are associated with the RACH preamble resource candidate set (e.g., see Embodiment 1 or 2) and explicit notification by the UCI (e.g., see Embodiment 3 or 4).

For example, the information on the TBS of the data part of Message A is associated with a set of Message-A RACH preamble resource candidates (e.g., specified by a combination of time resources, frequency resources, and sequence resources) as in Embodiment 1 or 2. On the other hand, the resource information of the data part of Message A is included in the UCI and notified as in Embodiment 3 or 4.

That is, terminal 200 transmits, to base station 100, Message A including the RACH preamble using the RACH preamble resource in the RACH preamble resource candidate set associated with the TBS dynamically selected by terminal 200 and the UCI indicating the resource information of the data part of Message A.

As is understood, the present embodiment enables configuration taking into consideration the trade-off between the effect of reducing an increase in overhead that is the merit of the implicit notification, and the effect of the notification by the UCI allowing efficient configuration of the RACH preamble resource.

Note that, in the present embodiment, the information on the TBS of the data part of Message A may be included in the UCI and notified as in Embodiment 3 or 4, and the resource position or resource amount of the data part of Message A may be associated with the Message-A RACH preamble resource candidate set (e.g., specified by combinations of time resources, frequency resources, and sequence resources) as in Embodiment 1 or 2.

For example, one of the information on the TBS and the information on the resource position or resource amount of the data part of Message A, which is smaller in number of selection candidates, may be notified by the UCI. This notification makes it possible to reduce the number of bits required for the UCI notification.

Further, the transmission parameters relevant to the data part of Message A are not limited to the TBS and resource information, but may also be other parameters.

The embodiments of the present disclosure have been described above.

Other Embodiment (1) The Message-A RACH preamble resource candidate set in the above-described embodiments is the RACH preamble resource candidate set for the 2-step Random access procedure.

Base station 100 or terminal 200 may, for example, support both the 4-step Random access procedure and 2-step Random access procedure. When base station 100 or terminal 200 supports both of the Random access procedures, the RACH preamble resource candidate sets may be divided into a group of resource sets for the 4-step Random access procedure and a group of resource sets for the 2-step Random access procedure.

Thus, based on the RACH preamble resource candidate set used by terminal 200, base station 100 is capable of identifying which Random access procedure is triggered by terminal 200.

(2) A size of 0 may be configured in configuration of the resource size of the data part of Message A in the above-described embodiments.

In this case, terminal 200 transmits the RACH preamble but does not transmit the data part in Message A.

In addition, when terminal 200 or base station 100 transmits or receives Message A whose data part has a size of 0, terminal 200 or base station 100 may recognize that the RACH procedure is the 4-step RACH procedure (in other words, transmission or reception of Message 1).

(3) In the above-described embodiments, the data transmitted by terminal 200 in the data part of Message A is not limited to the C-plane data such as the RRC connection request, scheduling request, or the like and the UP data.

For example, the data transmitted in the data part of Message A may include channel state information (Channel Quality Information (CQI)). The CSI obtained in a RACH procedure can be utilized for subsequent scheduling by base stations 100 for terminal 200.

At this time, CSI measurement information for terminal 200 to measure the CQI may be specified in advance in the specifications, or may be configured for terminal 200 by a higher layer signalling (e.g., SIB) transmitted by base station 100 or an UE-specific RRC signal.

Further, whether or not the CSI is included in Message A may be associated with the Message-A RACH preamble resource candidate set.

The other embodiments have been described above.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an exemplary embodiment of the present disclosure includes: control circuitry, which, in operation, dynamically determines a parameter relevant to transmission of a data part of a random access signal including a preamble part and the data part; and transmission circuitry, which, in operation, notifies a base station of the determined parameter using the random access signal.

In an exemplary embodiment of the present disclosure, a candidate for the parameter and a resource candidate set for the preamble part are associated with each other, and the transmission circuitry transmits a signal of the preamble part using a resource in the resource candidate set associated with the determined parameter.

In an exemplary embodiment of the present disclosure, association between the candidate for the parameter and the resource candidate set is indicated to the terminal by a higher layer signalling.

In an exemplary embodiment of the present disclosure, the parameter is a transport block size of the data part, and the transport block size that is a maximum transport block size configurable by the terminal is associated with the resource candidate set.

In an exemplary embodiment of the present disclosure, a number of resources included in the resource candidate set is different per the resource candidate set.

In an exemplary embodiment of the present disclosure, the control circuitry selects a synchronization signal, a broadcast channel, or a channel-state estimation reference signal depending on the determined parameter.

In an exemplary embodiment of the present disclosure, the transmission circuitry transmits the random access signal including uplink control information indicating information on the determined parameter.

In an exemplary embodiment of the present disclosure, a resource for the uplink control information is associated with a resource for the preamble part.

In an exemplary embodiment of the present disclosure, a candidate for a first parameter among a plurality of the parameters is associated with a resource candidate set for the preamble part, and the transmission circuitry transmits the random access signal including a signal of the preamble part and uplink control information, the signal of the preamble part using a resource in the resource candidate set associated with the first parameter, the uplink control information indicating a second parameter among the plurality of parameters that is different from the first parameter.

In an exemplary embodiment of the present disclosure, the control circuitry determines the parameter based on a data amount of the data part.

In an exemplary embodiment of the present disclosure, the parameter includes at least one of a transport block size, a radio resource, a modulation and coding scheme, transmit power, and a number of transmission ranks for the data part.

A communication method according to an exemplary embodiment of the present disclosure includes: dynamically determining a parameter relevant to transmission of a data part of a random access signal including a preamble part and the data part; and notifying a base station of the determined parameter using the random access signal.

The disclosure of Japanese Patent Application No. 2019-024182 dated Feb. 14, 2019 including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST

100 Base station
101, 209 Controller
102 Data generator
103, 106, 109, 211, 213 Encoder
104, 107, 110, 212, 214 Modulator
105 Higher control signal generator
108 Downlink control signal generator
111, 215 Signal allocator
112, 216 IFFT section
113, 217 Transmitter
114, 201 Antenna
115, 202 Receiver
116, 203 FFT section
117, 204 Extractor
118 Detector
119, 205 Demodulator
120, 206, 208 Decoder
200 Terminal
207 Downlink control signal demodulator
210 RACH preamble generator

The invention claimed is:

1. A terminal, comprising:
control circuitry, which, in operation, determines a size of a data part of a random access signal including a preamble part and the data part; and
transmission circuitry, which is coupled to the control circuitry and which, in operation, notifies a base station of the determined size using the random access signal, wherein
in response to a transmission of the random access signal, a Medium Access Control layer Protocol Data Unit (MAC PDU) including a response to the random access signal is received, and the MAC PDU includes i) information on a transmission timing of an uplink transmission, and ii) information on uplink resources of an uplink grant, and
the information on uplink resources includes at least one of a frequency resource, a resource amount, or a Modulation and Coding Scheme (MCS), and is used for a transmission of a message 3 in a case of a fallback mode.

2. The terminal according to claim 1, wherein
the size of the data part is associated with a resource candidate set of the preamble part, and
the preamble part is transmitted using a resource in the resource candidate set.

3. The terminal according to claim 2, wherein
an association between the size of the data part and the resource candidate set is indicated by a higher layer signaling.

4. The terminal according to claim 2, wherein
the resource candidate set is different between a 2 step random access type and 4 step random access type.

5. The terminal according to claim 2, wherein
the resource is determined based on a synchronization signal block (SSB) selected from a plurality of SSBs, and
in a case where there is one or more SSBs with a reference signal received power (RSRP) above a threshold, one of said one or more SSBs is selected as the SSB, and
in a case where there is no SSB with the RSRP above the threshold, any SSB is selected as the SSB.

6. The terminal according to claim 1, wherein
the preamble part and the data part are multiplexed by a time divisional multiplexing (TDM).

7. The terminal according to claim 1, wherein
the MAC PDU includes information relating to a contention resolution.

8. The terminal according to claim 7, wherein
in a case where information included in the random access signal matches with the information relating to the contention resolution included in the response to the random access signal, the terminal considers a random access procedure is successful.

9. The terminal according to claim 1, wherein
in a case where a response to the random access signal is not received within a determined period, the random access signal is retransmitted.

10. The terminal according to claim 1, wherein
in response to a transmission of the random access signal, a physical downlink control channel (PDCCH) identified by a Cell-Radio Network Temporary Identifier (C-RNTI) is received.

11. A communication method, comprising:
  determining a size of a data part of a random access signal including a preamble part and the data part;
  notifying a base station of the determined size using the random access signal; and
  in response to a transmission of the random access signal, receiving a Medium Access Control layer Protocol Data Unit (MAC PDU) including a response to the random access signal, wherein
  the MAC PDU includes i) information on a transmission timing of an uplink transmission, and ii) information on uplink resources of an uplink grant, and
  the information on uplink resources includes at least one of a frequency resource, a resource amount, or a Modulation and Coding Scheme (MCS), and is used for a transmission of a message 3 in a case of a fallback mode.

12. The communication method according to claim 11, wherein
  the size of the data part is associated with a resource candidate set of the preamble part, and
  the preamble part is transmitted using a resource in the resource candidate set.

13. The communication method according to claim 12, wherein
  an association between the size of the data part and the resource candidate set is indicated by a higher layer signaling.

14. The communication method according to claim 12, wherein
  the resource candidate set is different between a 2 step random access type and 4 step random access type.

15. The communication method according to claim 12, wherein
  the resource is determined based on a synchronization signal block (SSB) selected from a plurality of SSBs, and
  in a case where there is one or more SSBs with a reference signal received power (RSRP) above a threshold, one of said one or more SSBs is selected as the SSB, and
  in a case where there is no SSB with the RSRP above the threshold, any SSB is selected as the SSB.

16. The communication method according to claim 11, wherein
  the preamble part and the data part are multiplexed by a time divisional multiplexing (TDM).

17. The communication method according to claim 11, wherein
  the MAC PDU includes information relating to a contention resolution.

18. The communication method according to claim 17, comprising:
  in a case where information included in the random access signal matches with the information relating to the contention resolution included in the response to the random access signal, considering a random access procedure is successful.

19. The communication method according to claim 11, comprising:
  in a case where a response to the random access signal is not received within a determined period, retransmitting the random access signal.

20. The communication method according to claim 11, comprising:
  in response to a transmission of the random access signal, receiving a physical downlink control channel (PDCCH) identified by a Cell-Radio Network Temporary Identifier (C-RNTI).

* * * * *